United States Patent
Okuzaki et al.

(10) Patent No.: US 7,795,335 B2
(45) Date of Patent: Sep. 14, 2010

(54) CONDUCTIVE POLYMER GEL AND PROCESS FOR PRODUCING THE SAME ACTUATOR, PATCH LABEL FOR ION INTRODUCTION, BIOELETRODE, TONER, CONDUCTIVE FUNCTIONAL MEMBER ANTISTATIC SHEET, PRINTED CIRCUIT MEMBER, CONDUCTIVE PASTE, ELECTRODE FOR FUEL CELL, AND FUEL CELL

(75) Inventors: Hidenori Okuzaki, Kofu (JP); Masayoshi Ishihara, Tokyo (JP); Yasuhiro Endo, Tokyo (JP); Yuya Takahashi, Kanagawa (JP)

(73) Assignee: Toppan Forms Co., Ltd., Tokyo (JP)

( * ) Notice: Subject to any disclaimer, the term of this patent is extended or adjusted under 35 U.S.C. 154(b) by 1171 days.

(21) Appl. No.: 10/542,917

(22) PCT Filed: Jan. 27, 2004

(86) PCT No.: PCT/JP2004/000713

§ 371 (c)(1),
(2), (4) Date: Jul. 21, 2005

(87) PCT Pub. No.: WO2004/067037

PCT Pub. Date: Aug. 12, 2004

(65) Prior Publication Data

US 2006/0057451 A1    Mar. 16, 2006

(30) Foreign Application Priority Data

| Jan. 28, 2003 | (JP) | 2003-019120 |
| Oct. 24, 2003 | (JP) | 2003-364767 |
| Nov. 10, 2003 | (JP) | 2003-379628 |
| Nov. 10, 2003 | (JP) | 2003-380427 |
| Nov. 11, 2003 | (JP) | 2003-381700 |
| Nov. 11, 2003 | (JP) | 2003-381701 |
| Dec. 3, 2003  | (JP) | 2003-404884 |
| Dec. 3, 2003  | (JP) | 2003-404885 |

(51) Int. Cl.
C08K 5/42 (2006.01)

(52) U.S. Cl. ................ 524/158; 524/157; 524/379; 429/42

(58) Field of Classification Search .................. None
See application file for complete search history.

(56) References Cited

U.S. PATENT DOCUMENTS

| 5,766,515 | A  | * | 6/1998  | Jonas et al.   | 252/500 |
| 6,083,635 | A  | * | 7/2000  | Jonas et al.   | 428/690 |
| 6,248,818 | B1 | * | 6/2001  | Kim et al.     | 524/157 |
| 6,482,299 | B1 | * | 11/2002 | Inganas et al. | 204/242 |

FOREIGN PATENT DOCUMENTS

EP    0 999 242 A1    5/2000

(Continued)

OTHER PUBLICATIONS

Elmér et al. (Polymer 46 (2005), 7896-7908).*

(Continued)

*Primary Examiner*—David Wu
*Assistant Examiner*—Vu A Nguyen
(74) *Attorney, Agent, or Firm*—Oblon, Spivak, McClelland, Maier & Neustadt, L.L.P.

(57) ABSTRACT

A conductive polymer gel contains water, as a main component, a conductive conjugated polymer, and a surfactant and/or an alcohol, and also it may contain an electrolyte. The conductive conjugated polymer may further be doped with a dopant. The conductive polymer gel is obtained by adding a surfactant and/or an alcohol to a conductive conjugated polymer colloidal dispersion and/or a conductive conjugated polymer solution and leaving the mixture to stand, thereby to gelatinize the mixture.

4 Claims, 11 Drawing Sheets

FOREIGN PATENT DOCUMENTS

| | | |
|---|---|---|
| EP | 1 081 549 A1 | 3/2001 |
| EP | 1 215 224 A1 | 6/2002 |
| JP | 59-112688 | 6/1984 |
| JP | 62-131421 | 6/1987 |
| JP | 63-269165 | 11/1988 |
| JP | 64-87637 | 3/1989 |
| JP | 1-137266 | 5/1989 |
| JP | 1-159906 | 6/1989 |
| JP | 2-184861 | 7/1990 |
| JP | 3-100561 | 4/1991 |
| JP | 3-258239 | 11/1991 |
| JP | 4-293951 | 10/1992 |
| JP | 9-306240 | 11/1997 |
| JP | 11-290286 | 10/1999 |
| JP | 2000-2898 | 1/2000 |
| JP | 2001-406 | 1/2001 |
| JP | 2002-151828 | 5/2002 |
| JP | 2003-46257 | 2/2003 |
| JP | 2003-213148 | 7/2003 |
| JP | 2003-255594 | 9/2003 |
| JP | 2003-282078 | 10/2003 |
| JP | 2005-145987 | 6/2005 |
| WO | WO 98/03499 | 1/1998 |

OTHER PUBLICATIONS

Ghosh et al. (Adv. Mater. 1998, 10 (14), 1097-1099).*
Takashima et al. (Sensors and Actuators B 89 (2003), 48-52).*
Der-Jang Liaw, et al., "Synthesis and properties of poly(3-thiopheneacetic acid) and its networks via electropolymerization", Synthetic Metals, 1999, pp. 53-59.
M.C. Lefebvre, et al. "Electronically Conducting Proton Exchange Polymers as Catalyst Supports for Proton Exchange Membrane Fuel Cells", Journal of The Electromechanical Society, 146 (6), pp. 2054-2058, 1999.

* cited by examiner

FIG. 13A
FIG. 13B
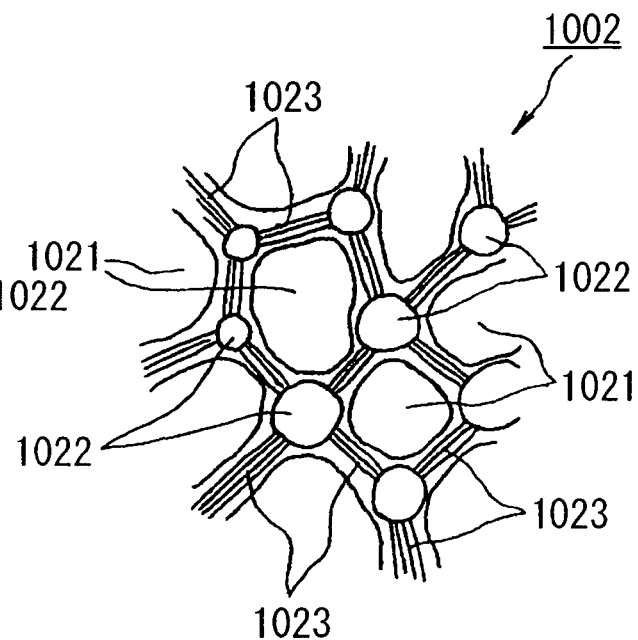
FIG. 14
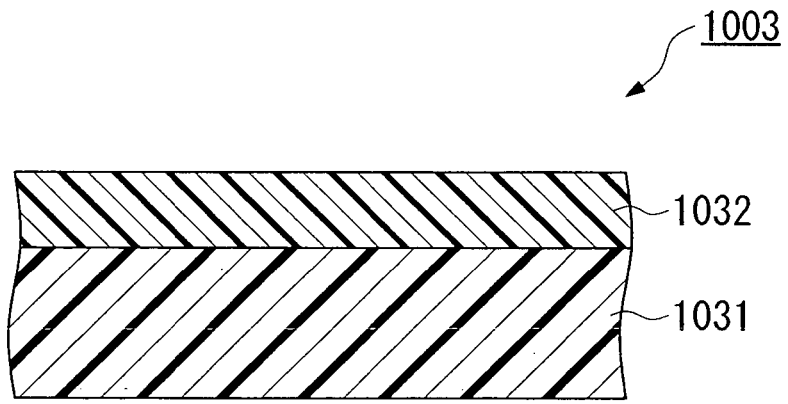

CONDUCTIVE POLYMER GEL AND
PROCESS FOR PRODUCING THE SAME
ACTUATOR, PATCH LABEL FOR ION
INTRODUCTION, BIOELETRODE, TONER,
CONDUCTIVE FUNCTIONAL MEMBER
ANTISTATIC SHEET, PRINTED CIRCUIT
MEMBER, CONDUCTIVE PASTE,
ELECTRODE FOR FUEL CELL, AND FUEL
CELL

TECHNICAL FIELD

The present invention relates to a conductive polymer gel which is easily gelatinized and has good conductivity, and to a method of producing the same. More particularly, the present invention relates to an actuator, an iontophoretic patch label, and a biomedical electrode, which employ the conductive polymer gel; a toner which employs the conductive polymer gel; a conductive functional member, an antistatic sheet, and a printed circuit member, which employ the toner; a conductive paste which employs the conductive polymer gel; an electrode for fuel cells, which employs the conductive polymer gel; and a fuel cell which employs the electrode for fuel cells.

BACKGROUND ART

As a conductive polymer gel, for example, there have hitherto been known the following.
(1) Japanese Patent Application, First Publication No. 2001-406 (Document 1) discloses a conductive polymer gel suitable for use in a biomedical electrode which is employed for measurement of a local bioelectric signal, and electrotherapy. An adhesive force of the conductive polymer gel does not decrease even when washed with water, and recovers to the previous level. The conductive polymer gel contains a crosslinked synthetic polymer, water, a polyhydric alcohol and an electrolyte salt. When the proportion of the crosslinked synthetic polymer is within a range from 18 to 25% by weight, the resulting gel contains a polymer main chain in a proper proportion and has sufficient stiffness strength. Since an electrolytic solution enclosed in a network of the gel can be stably maintained, a conductive polymer gel having characteristics described above is obtained.
(2) Synthetic Metals 99 (1999), 53-59 (Document 2), discloses that a solid film made of a gel-like polythiophene having a three-dimensional network is obtained by a method for electrolytic polymerization (electropolymerization) of a monomer. According to the method, polymerization and gelation of the monomer must be conducted in the same process.

However, the conductive polymer gel obtained by the prior art and the production method thereof had the following problems.

Since the conductive polymer gel disclosed in (1) contains an electrolyte and the electrolyte exhibits conductivity, it may exhibit unstable conductivity or fail to ensure good conductivity when exposed to an atmosphere at a temperature lower than the freezing point of water. That is, it was difficult for the conductive polymer gel of the prior art to maintain good conductivity in an atmosphere at low temperature lower than the freezing point of water.

Although the conductive polymer gel disclosed in (2) exhibits conductivity without containing an electrolyte, polymerization and gelation of the monomer must be conducted in the same process, and thus the process is complicated and a high level of technique is required in view of controllability.

As a toner for forming a circuit board, a toner comprising a core portion composed of metal particles, and an insulating resin portion, with which the surface of the core portion is coated, is used, as disclosed in Japanese Patent Application, First Publication No. 2002-151828 (Document 3) and Japanese Patent Application, First Publication No. 2003-255594 (Document 4).

When the toner containing metal particles is used in the production of a printed circuit board and electronic parts, it is difficult to separate metal powders constituting the toner from organic components such as a resin portion upon disposal of the printed circuit board and electronic parts. Therefore, it is difficult to recycle resources.

In particular, the toner for formation of the circuit board of the prior art comprises a core portion made of metal particles and, even if the printed circuit board and electronic parts produced by using the toner are incinerated, the metal component remains.

A conductive paste is a mixture of a conductive material such as metal powder, and a resin binder. The conductive paste is applied on a base material such as resin film or a substrate and is then cured by heating, thereby making it possible to impart conductivity to the base material. Therefore, the conductive paste is employed to form printed circuit boards such as antenna coils for RF-ID (Radio Frequency-Identification), circuit board of printed circuit boards, electrodes of liquid crystal displays, and membranes circuit boards of keyboards. In addition to the printed circuit boards, the conductive paste is employed to bond terminals and lead wires of electronic parts, and to form an internal conductive film (interlayer connection conductive layer) of a laminated ceramic capacitor.

As the conductive paste, Japanese Patent Application, First Publication No. Hei 1-159906 (Document 5) and Japanese Patent Application, First Publication No. Hei 9-306240 (Document 6) disclose a conductive paste comprising a metal powder, as a main component, and a resin vehicle (resin binder) in which the metal powder is dispersed.

Upon disposal of the printed circuit board and electronic parts, which employ the conductive paste, it is difficult to separate metal powders constituting the conductive paste from organic components such as resin vehicle. Therefore, it is difficult to recycle resources.

Since a polymer electrolyte type fuel cell (hereinafter referred to as PEFC) comprises a solid polymer film as an electrolyte and operates at low temperature within a range from 80 to 100° C., and is also capable of reducing size and weight, it is expected to be practically used as a power supply for moving vehicles such as electric cars.

An example of a technique with regard to PEFC is disclosed in Japanese Patent Application, First Publication No. 2003-282078 (Document 7). FIG. 22 is a schematic view showing a cell 3101 constituting a power generation portion of PEFC of the prior art. The cell 3101 comprises a polymer electrolyte film 3102, and a fuel electrode (negative electrode) 3131 and an air electrode (positive electrode) 3132 provided at both sides of the polymer electrolyte film 3102. The fuel electrode 3131 and the air electrode 3132, which serve as an electrode 3103, is composed of porous supporting layers 3161*a* and 3161*b* made of a carbon paper, as a current collector, and catalyst layers 3162*a* and 3162*b* provided on the supporting layers 3161*a* and 3161*b*.

The fuel electrode 3131 and the air electrode 3132 are provided at both sides of the polymer electrolyte film 3102 in a state in which the catalyst layers 3162a and 3162b are contacted with the polymer electrolyte film 3102.

A hydrogen gas is fed to the fuel electrode 3131 and the hydrogen gas is adsorbed to the catalyst layer 3162a on the fuel electrode 3131, and is then converted into hydrogen ions and electrons. The resulting hydrogen ions move to the side of the air electrode 3132 in the polymer electrolyte film 3102, together with water, while electrons flow through an external circuit board (not shown) toward the air electrode 3132 from the fuel electrode 3131.

An oxygen gas is fed to the air electrode 3132 and the oxygen gas is adsorbed to the catalyst layer 3162b on the air electrode 3132, and water is produced from oxygen molecules, and hydrogen ions and electrons moved from the fuel electrode 3131.

As the material of the catalyst layers 3162a and 3162b, platinum and a platinum alloy are mainly used. Since platinum is expensive, the cost required to produce PEFC increases. To reduce the amount of platinum, various techniques have been reported. However, since catalytic activity is reduced by an influence of catalyst poisoning due to a trace amount of carbon monoxide contained in a hydrogen gas in the fuel electrode 3131, it is necessary to use a large amount of platinum. Therefore, it is difficult to reduce the amount of platinum.

Furthermore, the fuel electrode 3131 and the air electrode 3132 are respectively composed of two layers, for example, supporting layers 3161a and 3161b and catalyst layers 3162a and 3162b, and each layer has a large thickness. Therefore, reductioon of the thickness of the electrode 3103 and the fuel cell is limited.

DISCLOSURE OF THE INVENTION

The conductive polymer gel of the present invention contains water, as a main component, a conductive conjugated polymer, and at least one of a surfactant and an alcohol.

The conductive polymer gel of the present invention is formed by gelatinizing a conductive conjugated polymer such as polyacetylene, polyphenylene, polypyrrole, polythiophene, polyfuran, or polyselenophene, and does not contain an electrolyte such as magnesium chloride as an essential component. Since the conductive conjugated polymer constituting the conductive polymer gel containing water, as a main component, a conductive conjugated polymer, a surfactant and/or an alcohol imparts conductivity, the conductive polymer gel can maintain good conductivity even when exposed to an atmosphere at a temperature lower than the freezing point of water.

Therefore, the conductive polymer gel of the present invention can be used for various purposes which require to exhibition of a stable function under such severe conditions that ambient temperature is lower than the freezing point of water, for example, conductive gels having functionality (e.g., response to electrolytic stimulation, response to moisture absorption, heat sensitizing response, etc.) such as electrolytes of cells.

The conductive polymer gel may contain an electrolyte. In the case in which it contains the electrolyte, the conductive polymer gel is provided with markedly excellent conductivity.

The conductive conjugated polymer contained in the conductive polymer gel exhibits conductivity without being doped with a dopant even if the electrolyte is not added. Since the conductive conjugated polymer and a gel which employs the same in the present invention are provided with both electrical conduction and ionic conduction, the conductivity is not impaired even when exposed to an atmosphere at a temperature lower than the freezing point of water.

The conductive conjugated polymer is at least one selected from polyacetylene, polyphenylene, polypyrrole, polythiophene, polyfuran, polyselenophene, polyisothianaphthene, polyphenylene sulfide, polyaniline, polyphenylenevinylene, polythiophenevinylene, poly-perinaphthalene, polyanthracene, polynaphthalene, polypyrene, polyazulene, and derivatives thereof. Among these polymers, polypyrrole or polythiophene is preferably used because it is excellent in stability, reliability and availability.

The dopant includes, for example, at least one selected from iodine, arsenic fluoride, iron chloride, perchloric acid, sulfonic acid, perfluorosulfonic acid, polystyrenesulfonic acid, sulfuric acid, hydrochloric acid, nitric acid, and derivatives thereof. Among these dopants, polystyrenesulfonic acid is preferable because high conductivity can be easily adjusted.

The surfactant includes, for example, at least one selected from alkylsulfuric acid or an ester salt thereof, polyoxyethylene alkyl ether sulfuric acid or an ester salt thereof, alkylbenzenesulfonic acid or a salt thereof, alkylnaphthalenesulfonic acid or a salt thereof, alkylsulfosuccinic acid or a salt thereof, alkyldiphenyl ether disulfonic acid or a salt thereof, naphthalenesulfonic acid or a formalin condensate thereof, and derivatives thereof. Among these surfactants, alkylbenzenesulfonic acid is preferable because of its chemical stability after gelation.

The alcohol includes, for example, at least one selected from isopropyl alcohol, butanol, ethylene glycol, propylene glycol, glycerin, erythritol, polyethylene glycol, polyvinyl alcohol, and derivatives thereof. Among these alcohols, a monohydric alcohol having 3 or more carbon atoms, or polyhydric alcohol is preferable, and ethylene glycol and polyethylene glycol are more preferable.

According to the method of producing a conductive polymer gel of the present invention, a surfactant and/or an alcohol are added to a conductive conjugated polymer colloidal dispersion and/or a conductive conjugated polymer solution, and then the mixture is left to stand, thereby to gelatinize the conductive conjugated polymer colloidal dispersion and/or the conductive conjugated polymer solution.

Since previously polymerized conductive conjugated polymer colloidal dispersion and/or conductive conjugated polymer solution are used as a starting material in the above method, it is not necessary to carry out polymerization and gelation of a monomer in the same process, like the method of the prior art. Additives such as surfactants and/or alcohols are added by pouring into the conductive conjugated polymer colloidal dispersion and/or the conductive conjugated polymer solution without forming bubbles. Then, a three-dimensional network is formed and the mixture is easily gelatinized only by leaving the mixture to stand in an open or closed space in a conventional atmospheric air for a predetermined time in a state free from vibration, and thus the above-described conductive polymer gel, which exhibits good conductivity, can be obtained in a stable manner.

The actuator of the present invention comprises an actuator body made of a conductive polymer gel, and the conductive polymer gel contains water, as a main component, a conductive conjugated polymer, and at least one of a surfactant and an alcohol. Although the actuator body may have any shape such as strip, spiral, ring, disk, comb, or indeterminate form, it preferably has a strip shape because it is easy to control a force. The strip shape does not mean only a precise rectangular solid, and its width and thickness may slightly vary in a longitudinal direction.

Only by replacing a dipping solution by water and a solvent such as acetone, the conductive polymer gel formed into a predetermined shape repeatedly expands or shrinks in the longitudinal direction. Therefore, the conductive polymer gel can be employed as the actuator.

The iontophoretic patch label of the present invention comprises a pad, and electrodes composed of an anode and a cathode provided on one surface of the pad at regular intervals. By contacting an analyte with the other surface of the pad and applying an electric current between the electrodes, a treating agent is locally delivered to the analyte. The pad is made of a conductive polymer gel containing water, as a main component, a conductive conjugated polymer, and a surfactant and/or an alcohol.

In the iontophoretic patch label, since the pad is composed of the conductive polymer gel containing water, as a main component, a conductive conjugated polymer, and a surfactant and/or an alcohol, good balance between electronic conduction and ionic conduction in the pad is maintained. Consequently, the thickness of a gel layer constituting the pad can be reduced, and thus it is made possible to reduce the thickness of the iontophoretic patch label.

The biomedical electrode of the present invention comprises an electrode device, and a member which electrically and physically connects the electrode device to an analyte. The member is made of a conductive polymer gel containing water, as a main component, a conductive conjugated polymer, and a surfactant and/or an alcohol.

In the biomedical electrode, the member, which electrically and physically connects the electrode device to the analyte, is made of a conductive polymer gel containing water, as a main component, a conductive conjugated polymer, and a surfactant and/or an alcohol, and therefore electronic conduction and ionic conduction can be optionally selected according to the conditions for production of the gel. Since the gel is provided with both electronic conduction and ionic conduction, good conductivity can be secured even when the gel layer constituting the member has a small thickness, and thus it is made possible to measure accurately. Furthermore, since the gel can stably retain shape for a long time, it is made possible to electrically and physically connect the electrode device to the analyte, satisfactorily.

The toner of the present invention comprises a core portion made of a conductive polymer gel containing water, as a main component, a conductive conjugated polymer, and a surfactant and/or an alcohol, and a resin portion provided on the surface of the core portion.

In a toner for formation of wiring of the prior art, metal particles have been used as a core portion. In the present invention, in contrast, a conductive polymer gel is used as the core portion in place of conventional metal particles, and thus the content of a metal component in the toner can be reduced as compared with the prior art. The core portion has preferably a spherical shape.

In the toner, the conductive conjugated polymer may further be doped with a dopant. Consequently, the concentration of a carrier in the conductive polymer gel can be increased and the conductivity can be improved.

The first conductive functional member of the present invention comprises a base material, and a conductive portion made of a toner provided on at least one surface of the base material. The toner comprises a core portion made of a conductive polymer gel containing water, as a main component, a conductive conjugated polymer, and a surfactant and/or an alcohol, and a resin portion provided on the surface of the core portion.

The antistatic sheet of the present invention comprises a base material, and a conductive portion made of a toner provided on at least one surface of the base material. The conductive portion has a planar shape, and the toner comprises a core portion made of a conductive polymer gel containing water, as a main component, a conductive conjugated polymer, and a surfactant and/or an alcohol, and a resin portion provided on the surface of the core portion.

The first printed circuit member of the present invention comprises a base material, and a conductive portion made of a toner provided on at least one surface of the base material. The conductive portion has a linear shape, and the toner comprises a core portion made of a conductive polymer gel containing water, as a main component, a conductive conjugated polymer, and a surfactant and/or an alcohol, and a resin portion provided on the surface of the core portion.

The content of the metal component in the toner is reduced as compared with the toner for formation of wiring of the prior art. Therefore, in the first conductive functional member, the antistatic sheet and the first printed circuit member described above, since the conductive portion is composed of the toner, the content of the metal component can be reduced as compared with the prior art.

The conductive paste of the present invention comprises a conductive polymer gel containing water, as a main component, a conductive conjugated polymer, and a surfactant and/or an alcohol; a conductive powder; and a resin binder.

Consequently, it is made possible to reduce the content of the conductive powder required to obtain sufficient conductivity. The conductive polymer gel in the conductive paste is the same polymer compound (organic compound) as the resin binder, and is easily miscible and is also excellent in compatibility.

With such a constitution of the conductive paste, the conductive conjugated polymer may further be doped with a dopant. Consequently, the concentration of a carrier in the conductive polymer gel can be increased and the conductivity can be improved.

The second conductive functional member of the present invention comprises a base material, and a conductive portion made of a conductive paste provided on at least one surface of the base material. The conductive paste comprises a conductive polymer gel containing water, as a main component, a conductive conjugated polymer, and a surfactant and/or an alcohol; a conductive powder; and a resin binder.

The second printed circuit member of the present invention comprises a base material, and a conductive portion made of a conductive paste provided on at least one surface of the base material. The conductive portion has a linear shape, and the conductive paste comprises a conductive polymer gel containing water, as a main component, a conductive conjugated polymer, and a surfactant and/or an alcohol; a conductive powder; and a resin binder. Consequently, in the second conductive functional member and the second printed circuit member, the content of the conductive powder required to obtain sufficient conductivity can be reduced as compared with the prior art.

With a constitution of the second printed circuit member, it serves as an antenna having a linear shape, and an IC chip may be connected to the antenna. Consequently, it can be used as a non-contact type IC media.

The electrode for fuel cell of the present invention comprises a conductive polymer gel containing water, as a main component, a conductive conjugated polymer, and a surfactant and/or an alcohol.

When using the conductive polymer gel as a fuel electrode, a hydrogen gas is dissolved in water contained in the conductive polymer gel, thereby making it possible to dissociate into hydrogen ions and electrons. When using the conductive polymer gel as an air electrode, an oxygen gas can be incorporated by dissolving in water contained in the conductive polymer gel. Therefore, the electrode for fuel cells, comprising a supporting layer, on which a catalyst layer made of platinum is supported, of the prior art can be replaced by the conductive polymer gel.

In the electrode for fuel cells, the conductive conjugated polymer may further be doped with a dopant. Consequently, the concentration of a carrier in the polymer gel can be increased and the conductivity can be improved.

The fuel cell of the present invention is a fuel cell comprising a power generation portion composed of one or more cells stacked with each other, each cell comprising first and second electrodes, and an electrolyte interposed between the electrodes, wherein the first electrode and/or the second electrode comprise a conductive polymer gel containing water, as a main component, a conductive conjugated polymer, and a surfactant and/or an alcohol.

Consequently, an electrode for fuel cells can be produced at low cost as compared with the case of using a supporting layer, on which a catalyst layer made of platinum is supported, of the prior art, and it is made possible to reduce the thickness of a power generator which employs the fuel cell.

BRIEF DESCRIPTION OF THE DRAWINGS

FIG. 13A is an explanatory view showing schematically a colloidal water dispersion of PEDOT/PSS, and FIG. 13B is an explanatory view showing schematically an example of a conductive polymer gel according to the present invention.

FIG. 14 is a schematic sectional view showing an example of an antistatic sheet.

BEST MODE FOR CARRYING OUT THE INVENTION

Preferred examples of the present invention will be described with reference to the accompanying drawings. The present invention is not limited to the following respective examples and constituent features of these examples may be appropriately used in combination.

In the present invention, a surfactant and/or an alcohol are added to a conductive conjugated polymer colloidal dispersion and/or a conductive conjugated polymer solution (hereinafter referred to as a conductive conjugated polymer colloidal dispersion), or a conductive conjugated polymer colloidal dispersion doped with a dopant, and then the mixture is left to stand under gelation conditions. Consequently, the conductive conjugated polymer colloidal dispersion is gelatinized to obtain a conductive polymer gel.

As disclosed in the examples described hereinafter, the conductive polymer gel is a gel having conductivity and also has properties which are different from those of a "fluid which has high viscosity but flows". For example, even in the case of making a trial of discharging the conductive polymer gel of the present invention at normal temperature under atmospheric pressure from a container such as a beaker by inclining the beaker or turning it upside down, the conductive polymer gel is not discharged from the beaker.

Figure 1:
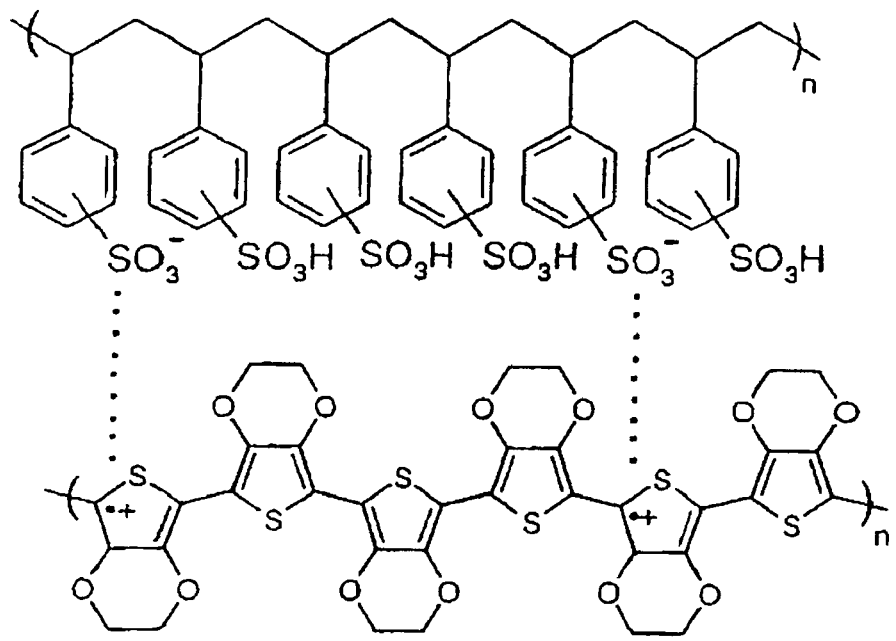
FIG. 1 is an explanatory view showing schematically a molecular structure of a conductive poly(3,4-ethylenedioxythiophene)-poly(styrenesulfonic acid) (PEDOT/PSS).

FIG. 1 is an explanatory view showing schematically a molecular structure of a conductive poly(3,4-ethylenedioxythiophene)-poly(styrenesulfonic acid) (PEDOT/PSS).

Figure 2A:
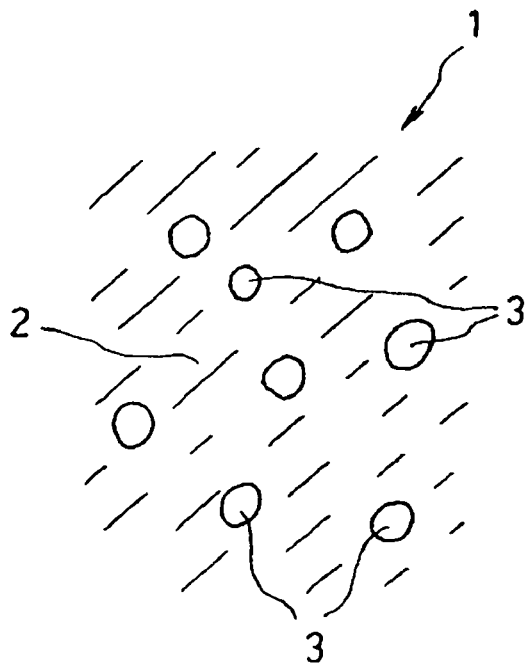
FIG. 2A is an explanatory view showing schematically a colloidal water dispersion of PEDOT/PSS.
Figure 2B:
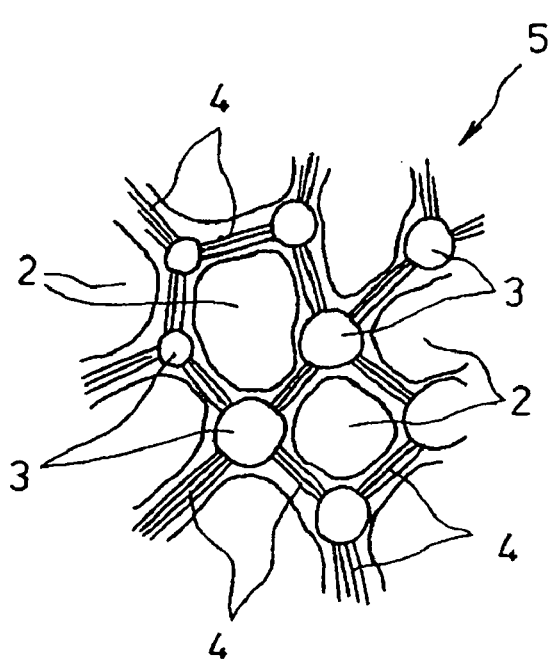
FIG. 2B is an explanatory view showing schematically a conductive polymer gel of the present invention obtained by adding a surfactant to the colloidal water dispersion of PEDOT/PSS shown in FIG. 2A, thereby to gelatinize the colloidal water dispersion.

FIG. 2A is an explanatory view showing schematically a colloidal water dispersion of PEDOT/PSS. FIG. 2B is an explanatory view showing schematically a conductive polymer gel of the present invention obtained by adding a surfactant to the colloidal water dispersion of PEDOT/PSS shown in FIG. 2A, thereby to gelatinize the colloidal water dispersion.

As shown in FIG. 2A, in the colloidal water dispersion 1 of PEDOT/PSS, PEDOT/PSS molecules 3 are dispersed in water 2. When a surfactant 4 is added to the colloidal water dispersion 1 of PEDOT/PSS and the mixture is left to stand under gelation conditions, as shown in FIG. 2B, a three-dimensional network is formed via the surfactant 4 and the mixture is easily gelatinized while containing water 2 to obtain a conductive polymer gel 5.

It is believed that a gel is obtained by adding a surfactant (and/or an alcohol) to a colloidal water dispersion of PEDOT/PSS and leaving the mixture to stand under gelation conditions because a three-dimensional network is physically or chemically formed. It is believed that the resulting gel exhibits conductivity because of electrical conductivity and/or ionic conductivity. As a matter of course, it is not intended to limit this to such a way of thinking.

In the present invention, gelation conditions are not specifically limited. As disclosed in the examples described hereinafter, a gel can be easily obtained, for example, by adding a surfactant and/or an alcohol to a conductive conjugated polymer colloidal water dispersion under the conditions of an atmospheric air and a normal temperature, well mixing them and leaving the mixture to stand at a predetermined temperature within a range from freezing temperature to the boiling temperature for a predetermined time.

The temperature, at which gelation occurs to form a gel, is not limited, but is preferably from 5 to 90° C., and more preferably 50° C. or higher so as to obtain a solid gel having high conductivity and excellent handling properties.

The temperature and time upon standing vary depending on the kind of the conductive conjugated polymer colloidal dispersion, and the kind, combination and amount of the surfactant and the alcohol. It is preferable to appropriately select the temperature and time, which enable gelation with good efficiency and production of satisfactory gel.

The conductive conjugated polymer colloidal dispersion is obtained by dispersing at least one of (1) at least one of a conductive conjugated polymer selected from polyacetylene, polyphenylene, polypyrrole, polythiophene, polyfuran, polyselenophene, polyisothianaphthene, polyphenylene sulfide, polyaniline, polyphenylenevinylene, polythiophenevinylene, poly-perinaphthalene, polyanthracene, polynaphthalene, polypyrene, polyazulene, and derivatives thereof, and (2) conductive conjugated polymers doped with at least one dopant selected from iodine, arsenic fluoride, iron chloride, perchloric acid, sulfonic acid, perfluorosulfonic acid, polystyrenesulfonic acid, sulfuric acid, hydrochloric acid, nitric acid, and derivatives thereof, in a disperse medium (for example, water) in a colloidal state.

Specific examples thereof include a colloidal water dispersion of poly(3,4-ethylenedioxythiophene)-poly(styrenesulfonic acid) (hereinafter referred to as PEDOT/PSS) obtained by polymerizing 3,4-ethylenedioxythiophene in the presence of a catalyst such as iron (III) toluenesulfonate. The colloidal water dispersion is commercially available under the trade name of Baytron P (concentration of a conductive polymer (PEDOT/PSS): about 1.3% by weight, manufactured by Bayer Co.).

The conductive conjugated polymer solution is obtained by dissolving the conductive conjugated polymer in water or an organic solvent.

The conductive conjugated polymer colloidal dispersion and the conductive conjugated polymer solution can be used alone, or used in combination in arbitrary ratio.

The surfactant used in the present invention is not specifically limited and there can be used at least one surfactant selected from known cationic surfactants, anionic surfactants, amphoteric surfactants, nonionic surfactants, and mixtures of two or more kinds of them.

Examples of the cationic surfactant include quaternary alkylammonium salt and halogenated alkylpyridinium.

Examples of the anionic surfactant include alkylsulfuric acid or an ester salt thereof, polyoxyethylene alkyl ether sulfuric acid or a salt thereof, alkylbenzenesulfonic acid or a salt thereof, alkylnaphthalenesulfonic acid or a salt thereof, alkylsulfosuccinic acid or a salt thereof, alkyldiphenyl ether disulfonic acid or a salt thereof, fatty acid or a salt thereof, and naphthalenesulfonic acid or a formalin condensate thereof.

Examples of the amphoteric surfactant include alkylbetaine, amine oxide, and hydrolyzed collagen.

Examples of the nonionic surfactant include polyoxyethylene alkyl ether, polyoxyalkylene alkyl ether, polyoxyethylene, sorbitan fatty acid ester, polyoxyethylene fatty acid ester, polyoxyethylene sorbitol fatty acid ester, polyoxyethylene fatty acid ester, polyoxyethylene hardened castor oil, polyoxyethylene alkylamine, alkylalkanolamide, and derivatives thereof.

Among these surfactants, long-chain alkylbenzenesulfonic acid can be used, particularly preferably, because gelation efficiency is improved.

The amount of the surfactant to be added in the conductive polymer gel is not specifically limited, but is preferably from 0.1 to 30 parts by weight, and more preferably from 0.5 to 10 parts by weight, based on 1 part by weight of the conductive polymer. When the amount is less than 0.1 parts by weight, gelation may not occur. On the other hand, when the amount exceeds 30 parts by weight, gelation may not occur, too.

The alcohol is not specifically limited and there can be used at least one alcohol selected from known monohydric alcohols and polyhydric alcohols, and mixtures of two or more kinds of them.

Examples of the monohydric alcohol include branched or linear alcohols, such as ethanol, isopropyl alcohol, and butanol; cyclic alcohol, polymer-like alcohol, and mixtures of two or more kinds of them.

Examples of the polyhydric alcohol include glycols such as ethylene glycol and propylene glycol; chain polyhydric alcohols such as glycerin, erythritol, xylytol, and sorbitol; cyclic polyhydric alcohols such as glucose and sucrose; polymer-like polyhydric alcohols such as polyethylene glycol and polyvinyl alcohol; and mixtures of two or more kinds of them.

Among these alcohols, isopropyl alcohol, ethylene glycol and polyethylene glycol can be preferably used, and polyhydric alcohols such as ethylene glycol and polyethylene glycol are particularly preferable by the following reason. Ethylene glycol is used particularly preferably because it exerts an effect of causing gelation even at low concentration and also has no volatility. The molecular weight of polyethylene glycol is not specifically limited, but is preferably 1000 because gelation occurs even when the amount is smaller than that in case of the molecular weight of 400.

The amount of the alcohol in the conductive polymer gel is not specifically limited, but is preferably from 1 to 70 parts by weight, and more preferably from 10 to 50 parts by weight, based on 1 part by weight of the conductive polymer. When the amount is less than 1 part by weight, gelation may not occur. The amount of more than 70 parts by weight is not preferable because viscosity of gel becomes too low and gelation may not occur, too.

The surfactant and the alcohol can be used alone, or used in combination in arbitrary ratio. When using the surfactant in combination with the alcohol, the ratio thereof is not specifically limited.

Two typical techniques for producing the conductive polymer gel of the present invention will now be described.

<First Technique>

The first technique is a method of production in a conventional vial and its procedure will be described below.

(1a) Baytron P is added dropwise in a vial using a pipet, and then weighed.

(1b) Similarly, an additive such as ethylene glycol is added dropwise in the vial using a pipet.

(1c) After sealing by shutting a cap of the vial at room temperature in an atmospheric air, the solution in the vial is gently shaken by hand for one minute.

(1d) While sealed, the vial is left to stand in a stable location in an atmosphere maintained at a temperature of 10° C. (in a refrigerator), 25° C. (in a room) and 50° C. (in a heating oven). In that case, the vial is exposed to an air at each temperature.

(1e) After about 3 days, the formation of a gel is confirmed and the gel is taken out. After returning to about room temperature, the gel is stored in a cool and dark space (at a temperature ranging from 5° C. to 10° C.).

Through the steps (1a) to (1e) described above, a conductive polymer gel is obtained in the vial.

<Second Technique>

The second technique is a method of producing a film-like gel and its procedure will be described below.

(2a) The solution containing ethylene glycol added therein obtained in the step (1c) of the first technique is gently poured into a glass pan made of PYREX®, thereby to completely the pan with the solution without forming bubbles. In that case, the pan is exposed to an air at each temperature.

(2b) The pan is left to stand in a stable location at a temperature of 50° C. (in a heating furnace) under a normal pressure in an air.

(2c) After about 3 days, the formation of a gel is confirmed and the gel is taken out. The gel is left to stand until it returns to about room temperature.

(2d) Using a sprayer, distilled water is sprayed over the entire surface of the gel and the gel is left to stand at room temperature in an atmospheric air for about 30 seconds.

(2e) A solvent, for example, acetone is poured into the pan from the peripheral portion, thereby to cover the surface of the gel.

(2f) A sharp jig, for example, a tip portion of forceps, is inserted between the bottom of the pan and the gel, and then the gel is peeled off.

(2g) The gel is slowly cut using a shear means, for example, a cutting edge of a razor, and is then cut into pieces having arbitrary width and length.

Through the steps (2a) to (2g) described above, a conductive polymer gel in the form of a strip is obtained.

Electrical characteristics of the conductive polymer gel, for example, conductivity and electromotive force can be determined by the following methods.

<Method for Measurement of Conductivity>

(3a) A cylindrical cell comprising an open upper base and an open lower base, which has an inner diameter of 5 mm and a height of 10 mm, is put in the solution prepared in the step (1c) to form a gel.

(3b) After forming the gel, the cell is transferred into an atmospheric air in a state where the gel is included in the cylinder.

(3c) In the atmospheric air, a platinum electrode is disposed on the entire surface of each exposed portion of the gel, which constitutes the upper and lower bases of the cylindrical cell, so as to cover-each exposed portion.

(3d) Both ends of the gel included in the cylindrical cell are interposed between the platinum electrodes and the conductivity is measured by a two-terminal method.

<Method for Measurement of Electromotive Force>

(4a) The gel obtained in the step (1e) is transferred to a container made of an material, for example, a beaker, and then a copper sheet and an aluminum sheet, as an electrode, are fixed by inserting into the gel at regular intervals of about 1 cm.

(4b) Both sheets as the electrode are connected to a circuit tester connected via a copper lead wire to form a measuring circuit board.

(4c) A potential obtained immediately after connecting the measuring circuit board is read by the circuit tester.

Through the steps (4a) to (4c) described above, the electromotive force of the conductive polymer gel can be easily measured.

Embodiment of Toner

Figure 11:
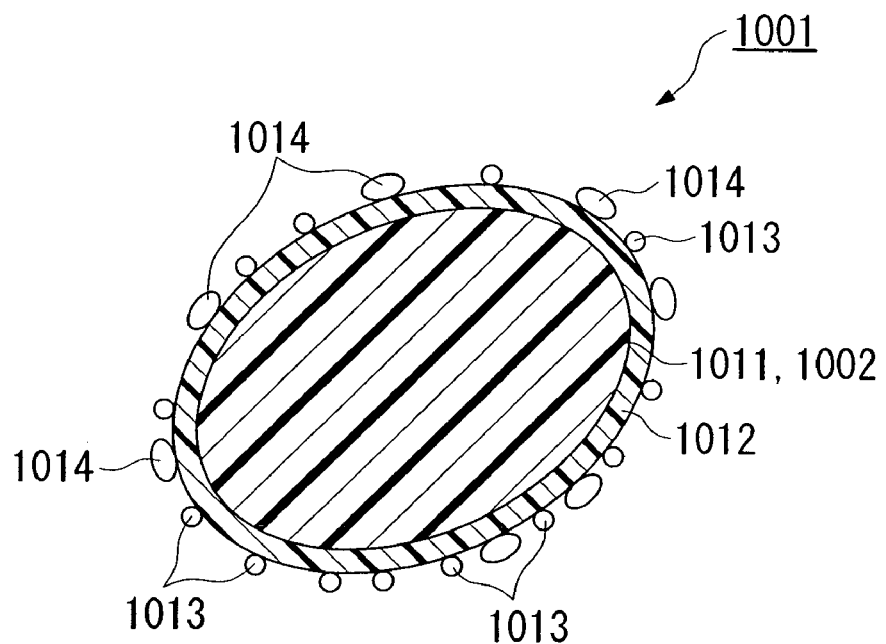
FIG. 11 is a schematic sectional view showing an example of a toner according to the present invention.

FIG. 11 is a schematic sectional view showing an example of a toner 1001 according to an embodiment of the present invention. The toner 1001 comprises a generally spherical core portion 1011 made of a conductive polymer gel 1002, and a resin portion 1012 provided on the surface of the core portion 1011.

The particle size of the toner 1001 is preferably 15 µm or less, and more preferably 8 µm or less. Consequently, excellent resolution can be realized and a pattern wiring having a fine line width can be formed when the toner 1001 is transferred and fixed onto a base material.

As shown in FIG. 13B, the conductive polymer gel 1002 comprises water 1021, as a main component, a conductive conjugated polymer 1022, and a surfactant 1023 and/or an alcohol.

The conductive polymer gel 1002 is formed by gelatinizing a conductive conjugated polymer 1022 using a surfactant 1023 and/or an alcohol, and those proposed in Japanese Patent Application No. 2003-19120 can be applied.

Figure 12:
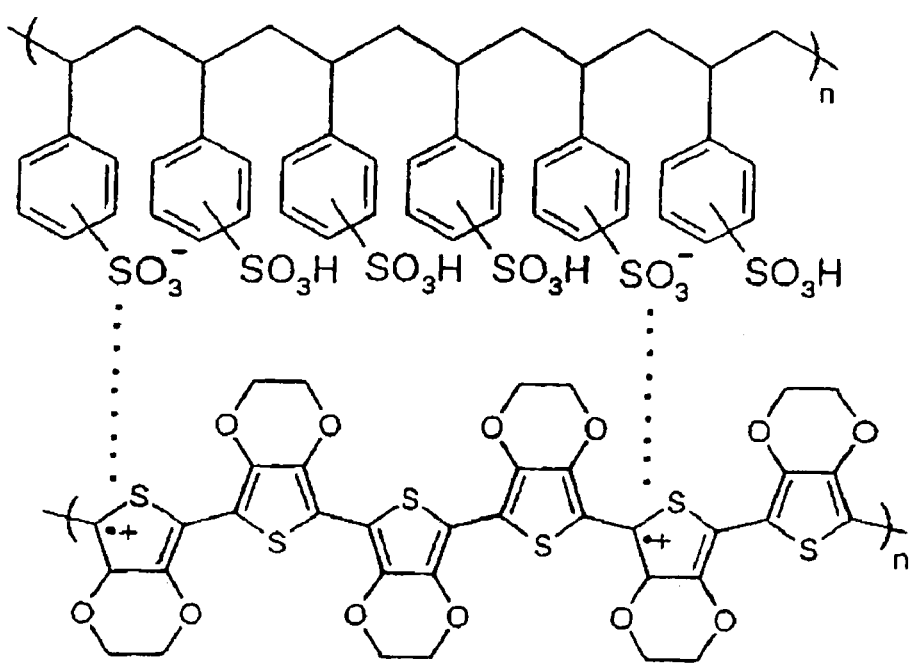
FIG. 12 is a schematic view showing an example of a molecular structure of a conductive conjugated polymer.

FIG. 12 is a schematic view showing an example of a molecular structure of the conductive conjugated polymer 1022 shown in FIG. 13B. The conductive conjugated polymer 1022 is poly(3,4-ethylenedioxythiophene)-poly(styrenesulfonic acid) (hereinafter referred to as PEDOT/PSS) and is obtained by doping poly(3,4-ethylenedioxythiophene) (hereinafter referred to as PEDOT) with polystyrenesulfonic acid. (hereinafter referred to as PSS) as a dopant.

FIG. 13A is an explanatory view showing schematically a colloidal water dispersion of PEDOT/PSS, and FIG. 13B is an explanatory view showing schematically a conductive polymer gel 1002 of the present invention obtained by adding a surfactant 1023 to the colloidal water dispersion of PEDOT/PSS shown in FIG. 13A and gelatinizing the mixture.

As shown in FIG. 13A, in the colloidal water dispersion of PEDOT/PSS, PEDOT/PSS molecules are dispersed in water 1021. When the surfactant 1023 is added to the colloidal water dispersion of PEDOT/PSS and the mixture is left to stand under the gelation conditions, as shown in FIG. 13B, a three-dimensional network is formed via the surfactant 1023 and the mixture is easily gelatinized while including water 1021 therein, and thus a conductive polymer gel 1002 is obtained.

It is believed that a gel is obtained by adding the surfactant 1023 (and/or an alcohol) to the colloidal water dispersion of PEDOT/PSS and leaving the mixture to stand under gelation conditions because a three-dimensional network is physically or chemically formed. It is considered that the resulting gel exhibits conductivity because of electrical conductivity and/or ionic conductivity. As a matter of course, this is not intended to be limited to such a way of thinking.

The conductive conjugated polymer 1022 includes, for example, at least one selected from polyacetylene, polyphenylene, polypyrrole, polythiophene, polyfuran, polyselenophene, polyisothianaphthene, polyphenylene sulfide, polyaniline, polyphenylenevinylene, polythiophenevinylene, poly-perinaphthalene, polyanthracene, polynaphthalene, polypyrene, polyazulene, and derivatives thereof. Among these polymers, polypyrrole or polythiophene shown in FIG. 12 is preferably used because it has high stability and high reliability and is readily available.

The conductive conjugated polymer 1022 is preferably doped with a dopant, whereby, the concentration of a carrier in the conductive polymer gel 1002 increases and conductivity can be improved.

The dopant includes, for example, at least one selected from iodine, arsenic fluoride, iron chloride, perchloric acid, sulfonic acid, perfluorosulfonic acid, polystyrenesulfonic acid, sulfuric acid, hydrochloric acid, nitric acid, and derivatives thereof. Among these dopants, polystyrenesulfonic acid is preferable because high conductivity can be easily adjusted.

Examples of the colloidal dispersion of the conductive conjugated polymer 1022 include a colloidal water dispersion of poly(3,4-ethylenedioxythiophene)-poly(styrenesulfonic acid) (hereinafter referred to as PEDOT/PSS) obtained by polymerizing 3,4-ethylenedioxythiophene in the presence of a catalyst such as iron (III) toluenesulfonate. The colloidal water dispersion is commercially available under the trade name Baytron P (about 1.3 wt % dispersion of a conductive polymer (PEDOT/PSS), manufactured by Bayer Co.).

The surfactant 1023 is not specifically limited and there can be used at least one surfactant selected from known cationic surfactants, anionic surfactants, amphoteric surfactants, nonionic surfactants, and mixtures of two or more kinds thereof.

Examples of the cationic surfactant include quaternary alkylammonium salt and halogenated alkylpyridinium.

Examples of the anionic surfactant include alkylsulfuric acid or an ester salt, polyoxyethylene alkyl ether sulfuric acid or a salt thereof, alkylbenzenesulfonic acid or a salt thereof, alkylnaphthalenesulfonic acid or a salt thereof, alkylsulfosuccinic acid or a salt thereof, alkyldiphenyl ether disulfonic acid or a salt thereof, fatty acid or a salt thereof, and naphthalenesulfonic acid or a formalin condensate thereof.

Examples of the amphoteric surfactant include alkylbetaine, amine oxide, and hydrolyzed collagen.

Examples of the nonionic surfactant include polyoxyethylene alkyl ether, polyoxyalkylene alkyl ether, polyoxyethylene, sorbitan fatty acid ester, polyoxyethylene fatty acid ester, polyoxyethylene sorbitol fatty acid ester, polyoxyethylene fatty acid ester, polyoxyethylene hardened castor oil, polyoxyethylene alkylamine, alkylalkanolamide, and derivatives thereof.

Among these surfactants 1023, long-chain alkylbenzenesulfonic acid is used, particularly preferably, because gelation efficiency is improved.

The amount of the surfactant 1023 to be added to the conductive polymer gel is not specifically limited, but is preferably from 0.1 to 30 parts by weight, and more preferably from 0.5 to 10 parts by weight, based on 1 part by weight of the conductive polymer. When the amount is less than 0.1 parts by weight, gelation may not occur. The amount of more than 30 parts by weight is not preferable because gelation may not occur, too.

The alcohol is not specifically limited and there can be used at least one alcohol selected from known monohydric alcohols and polyhydric alcohols, and mixtures of two or more kinds thereof.

Examples of the monohydric alcohol include branched or linear alcohols, such as ethanol, isopropyl alcohol, and butanol; cyclic alcohol, polymer-like alcohol, and mixtures of two or more kinds thereof.

Examples of the polyhydric alcohol include glycols such as ethylene glycol and propylene glycol; chain polyhydric alcohols such as glycerin, erythritol, xylytol, and sorbitol; cyclic polyhydric alcohols such as glucose and sucrose; polymer-like polyhydric alcohols such as polyethylene glycol and polyvinyl alcohol; and mixtures of two or more kinds thereof.

Among these alcohols, isopropyl alcohol, ethylene glycol and polyethylene glycol can be preferably used, and polyhydric alcohols such as ethylene glycol and polyethylene glycol are particularly preferable for the following reason. Ethylene glycol is used particularly preferably because it exerts an effect of causing gelation even at low concentration and also has no volatility. The molecular weight of polyethylene glycol is not specifically limited, but is preferably 1000 because gelation occurs even when the amount is less than that in case of the molecular weight of 400.

The amount of the alcohol in the conductive polymer gel 1002 is not specifically limited, but is preferably from 1 to 70 parts by weight, and more preferably from 10 to 50 parts by weight, based on 1 part by weight of the conductive polymer. When the amount is less than 1 part by weight, gelation may not occur. The amount of more than 70 parts by weight is not preferable because viscosity of gel becomes too small and gelation may not occur, too.

The surfactant 1023 and the alcohol can be used alone, or used in combination in arbitrary ratio. When using the surfactant 1023 in combination with the alcohol, the ratio thereof is not specifically limited.

The conductive conjugated polymer 1022 is gelatinized by using the surfactant 1023 and/or the alcohol by the following method.

The surfactant 1023 and/or the alcohol as the additive are added by pouring into a colloidal dispersion prepared by dispersing the conductive conjugated polymer 1022 in water 1021 in a colloidal state and/or a conductive conjugated polymer solution without forming bubbles.

Then, the mixture is left to stand in an open or closed space in a conventional atmospheric condition for a predetermined time in a state free from vibration.

Consequently, a three-dimensional network was formed and the mixture was easily gelatinized, and thus a conductive polymer gel 1002 as a constituent gel of a toner 1001 is obtained in a stable manner.

The conductive conjugated polymer solution is obtained by dissolving the conductive conjugated polymer 1022 in water or an organic solvent. The conductive conjugated polymer colloidal dispersion and the conductive conjugated polymer solution can be used alone, or can also be used in combination in arbitrary ratio.

The core portion 1011 constituting the toner 1001 is composed of the conductive polymer gel 1002 and its shape is not specifically limited, but the core portion is in the form of particles.

The amount of the conductive polymer gel 1002 constituting the core portion 1011 is preferably 40 parts by weight or more, and more preferably 65 parts by weight or more, based on 100 parts by weight of the toner 1001, and thus sufficient conductivity can be imparted to the base material when the toner 1001 is transferred onto the base material.

The surface of the core portion 1011 is coated with the resin portion 1012. The resin portion 1012 is composed of an insulating resin, which serves as a binder, and there can be applied those which are used as a known binder for toner.

Examples thereof include resins capable of fixing a toner by heat, such as styrene-acrylic copolymer resin, polyester resin, and epoxy resin; and resin mixtures obtained by adding a conductive polymer to the resins.

The amount of the resin constituting the resin portion 1012 is preferably 0.1 parts by weight or more, and more preferably 30 parts by weight or less, based on 100 parts by weight of the toner 1001, and thus sufficient chargeability can be imparted to the surface of the toner 1001.

On the surface of the core portion 1011, that is, interface between the core portion 1011 and the resin portion 1012, an insulating portion made of various insulating components such as resin is provided, thereby to improve chargeability of the surface of the toner 1001 and to enhance developability.

The surface of the toner 1001 is coated with a charge control agent 1013, thereby making it possible to adjust polarity (charge polarity) capable of charging the surface of the toner 1001 in the case of charging the toner 1001.

As the charge control agent 1013, known charge control agents can be used and examples thereof include quaternary ammonium salt, azo-based metal-containing complex, salicylic acids metal complex, calixarenes, and amino group-containing fluorides. According to charge polarity of the surface of the toner 1001, the charge control agent can be appropriately selected and used.

The amount of the charge control agent 1013 is preferably 0.1 parts by weight or more, and more preferably 5 parts by weight or less, based on 100 parts by weight of the toner 1001, and thus desired charge polarity can be imparted to the surface of the toner 1001.

The surface of the toner 1001 is coated with a releasant 1014. As the releasant 1014, known relesants can be used and examples thereof include olefinic wax and carnauba wax.

The amount of the releasant 1014 is preferably 0.1 parts by weight or more, and more preferably 10 parts by weight or less, based on 100 parts by weight of the toner 1001, and thus sufficient releasability can be obtained.

The toner 1001 can be produced by known methods such as grinding methods and particle precipitation methods. For example, a conductive polymer gel 1002 is finely ground into particles, which serve as a core portion 1011, and finely ground particles of the conductive polymer gel 1002 are mixed with a resin, which serves as a resin portion 1012, and then the mixture is granulated to obtain a toner 1001 comprising the resin portion 1012 and the core portion 1011 whose surface is coated with the resin portion.

The conductive polymer gel 1002, which constitutes the core portion 1011 of the toner 1001, is the same polymer compound (organic compound) as an insulating resin (binder) constituting the resin portion 1012, and is easily miscible and is also excellent in compatibility, and thus the entire surface of the core portion 1011 can be uniformly coated with the resin portion 1012.

In the toner for formation of a circuit board of the prior art, metal particles constituting the core portion is not easily miscible with the resin constituting the resin portion, and thus it is difficult to coat the entire surface of the core portion with the resin portion. Therefore, the core portion is exposed on the surface of the toner and chargeability of the toner deteriorates, thereby causing a problems such as poor development.

In contrast, according to the present invention, the entire surface of the core portion 1011 can be uniformly coated with the resin portion 1012, as described above, thus making it possible to realize a toner 1001 which is excellent in chargeability and can suppress poor development.

The toner 1001 can be transferred and fixed onto the base material by a known developing system. Examples of the transfer method include toner image transfer methods such as electrostatic latent image transfer, electrostatic corona transfer, electrostatic belt transfer, electrostatic roller transfer, adhesion transfer, pressure transfer, and magnetic transfer methods. When using multi-color or plural toners in combination, there can be used multiple transfer systems such as multiple developing, transfer drum, intermediate transfer, and tandem systems.

In the toner for formation of a circuit board of the prior art, the core portion is composed of metal particles and true density is large, and therefore the development process requires a large charge amount.

In contrast, according to the present invention, since the core portion 1011 is made of a resin, like the toner for PPC (Plain Paper Copier), true density is small and the toner can be transferred and fixed onto the base material using a conventional copier.

The first conductive functional member, the antistatic sheet 1003, and the first printed circuit member of the present invention will now be described.

The first conductive functional member of the present invention comprises a sheet-like base material made of a resin film of PET (polyethylene terephthalate) or paper, and a conductive portion made of a toner provided on at least one surface of the base material.

The conductive portion was formed by transferring and fixing the toner 1001 onto the base material. Detailed description of the toner 1001 is omitted because it is as described hereinabove. The base material is not limited to a sheet-like base material and may be any member on which the toner 1001 is transferred and fixed.

As described above, the toner 1001 can be transferred and fixed onto the base material by a known developing system and a fine conductive portion can be formed with high accuracy.

The shape of the conductive portion is not specifically limited and examples thereof include linear or planar conductive portion on which the toner 1001 is transferred and fixed onto at least one surface of the base material.

The linear shape refers to a shape of one or plural straight lines or curved line, for example, pattern shape such as wavy shape, straight line, curved line, coil shape, polygon such as triangle or quadrangle, circle, ellipse, and shape, letter and symbol of a combination thereof. A planar conductive portion can be formed by forming plural linear conductive portions without pitches (intervals).

Examples of the planar conductive portion include a conductive portion whose one surface has a shape, for example, a polygon such as a triangle or quadrangle, circle, ellipse, and shape and symbol of a combination thereof.

The conductive portion is not limited to those formed on the surface of the base material and may be those formed by transferring and fixing the toner 1001 inside the pore portion, recessed portion or groove provided on the base material.

Therefore, a conductive portion having a one-, two- or three-dimensional shape can be formed by using linear conductive portions alone or in combination. For example, a conductive portion having a one-dimensional shape can be used as wiring and a conductive portion having a two-dimensional shape can be used as a pattern wiring, an electrode, an electromagnetic coil, and an antenna. A conductive portion having a three-dimensional shape can be used as a through electrode.

Impedance characteristics and conductivity can be controlled by appropriately selecting the thickness, width, length and shape of the conductive portion, and the first conductive functional member can be used for various purposes which utilize the conductivity of the conductive portion.

The first conductive functional member can be used as a wiring substrate and can be applied to various electronic equipment by mounting various electronic parts such as light emitting devices and IC chip on the base material. It can also be used as an IC tag and an IC label.

FIG. 14 is a schematic sectional view showing an example of an antistatic sheet 1003 according to the present invention. The antistatic sheet 1003 is an example of the first conductive functional member and a conductive portion 1032 provided on a sheet-like base material 1031 has a planar shape.

In the antistatic sheet 1003 as an example shown in FIG. 14, the conductive portion 1032 is provided on the entire surface of the base material 1031.

In the antistatic sheet 1003, the conductive portion 1032 imparts conductivity to the surface (surface of the base material 1031) of the antistatic sheet 1003 and the base material 1031 is not charged. The conductive portion 1032 may be provided on a portion of at least one surface of the base material 1031.

The first printed circuit member of the present invention is an example of the first conductive functional member and the conductive portion provided on the sheet-like base material has a linear shape.

The linear conductive portion can be used as a pattern wiring, an electrode, a through electrode, an electromagnetic coil, and an antenna. Therefore, the first printed circuit member can be used as a wiring substrate, an IC tag, and an IC label.

Since a planar conductive portion can be formed by forming plural linear conductive portions without pitches (intervals), the conductive portion may be a planar conductive portion.

Since the core portion 1011 of the toner 1001 is made of the conductive polymer gel 1002, the content of the metal component in the toner 1001 can be reduced as compared with the toner for formation of wiring of the prior art, wherein the core portion is made of metal particles. Consequently, it is made possible to reduce the environmental burden upon disposal of the printed circuit board or electronic parts made of the toner 1001.

In the first conductive functional member of the present invention, the antistatic sheet 1003, and the first printed circuit member, since the conductive portion 1032 provided on at least one surface of the base material 1031 is composed of the toner 1001 of the present invention, the content of the metal component can be reduced and the environmental burden upon disposal can be reduced as compared with the toner for formation of wiring of the prior art, wherein the core portion is made of metal particles.

The technical scope of the present invention is not limited to the above embodiments and various modifications can be made without departing from the scope of the present invention.

For example, the surface of the toner 1001 may be coated with an external additive so as to improve fluidity. As the external additive, known external additives can be used and examples thereof include fine inorganic particles such as silica, alumina, and titania (titanium oxide); and fine resin particles.

The surface of the toner 1001 may be coated with coating agents such as silicone polymer and fluorine polymer; and carbon black.

According to the transferring and fixing system (developing system) of the toner 1001, the toner 1001 is coated with a magnetic material.

For example, the toner may contain magnetic particles such as iron particles and ferrite particles, or a magnetic material such as magnetic particles whose surfaces are coated with a resin portion in the core portion 1011 or the resin portion 1012, or the toner may be a toner 1001 whose surfaces are coated with the magnetic material.

According to the developing system of the toner 1001, the toner 1001 is mixed with a carrier. According to the transferring and fixing system (developing system) of the toner 1001, a powder of the toner 1001 may be mixed with a carrier powder.

As the carrier, known carriers can be used and examples thereof include fine resin particles and magnetic powder. The particle size of the carrier is preferably 200 µm or less, and more preferably 100 µm or less. Consequently, it is made possible to achieve sufficient resolution.

Conductive Paste

Figure 15:
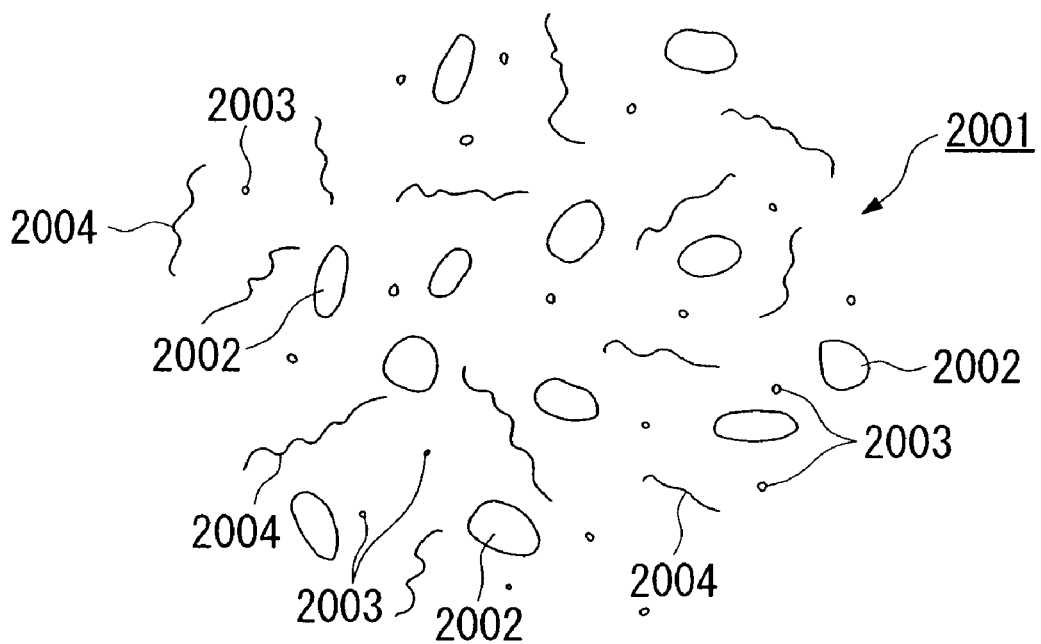
FIG. 15 is a schematic view showing an example of a conductive paste according to the present invention.

FIG. 15 is a schematic view showing a conductive paste 2001 according to an embodiment of the present invention. The conductive paste 2001 contains at least a conductive polymer gel 2002, a conductive powder 2003, and a resin binder 2004. The conductive polymer gel 2002 and the conductive powder 2003 are conductive materials in the conductive paste 2001.

Figure 17A:
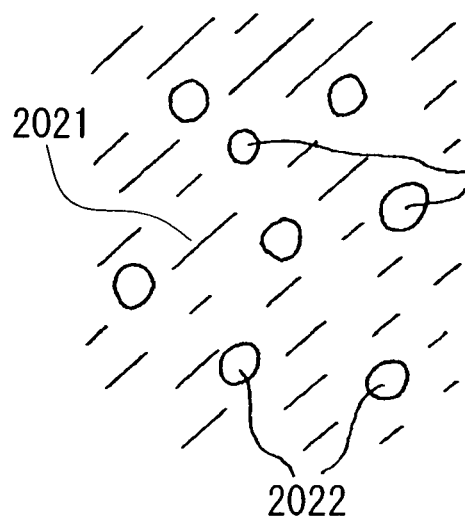
FIG. 17A is an explanatory view showing schematically a colloidal water dispersion of PEDOT/PSS.
Figure 17B:
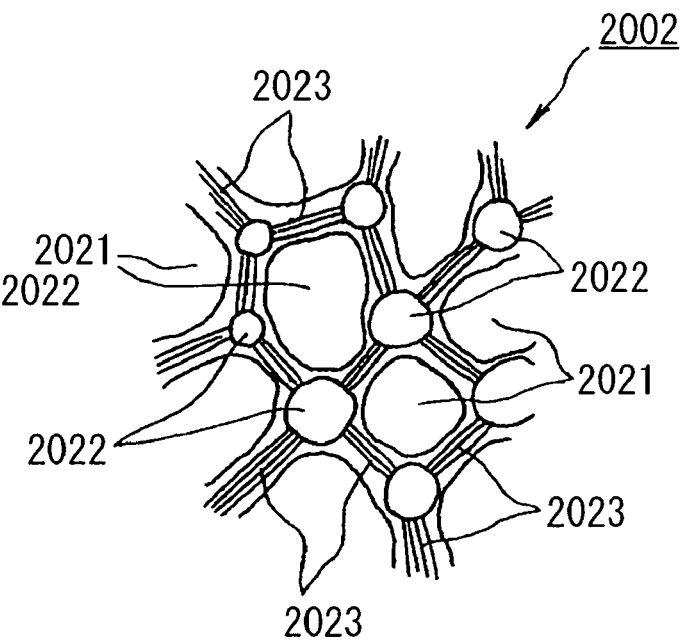
FIG. 17B is an explanatory view showing schematically an example of a conductive polymer gel according to the present invention.

The conductive polymer gel 2002 comprises water 2021, as a main component, the conductive conjugated polymer 2022, and the surfactant 2023 and/or the alcohol, as shown in FIG. 17B described hereinafter.

The conductive polymer gel 2002 is formed by gelatinizing the conductive conjugated polymer 2022 by the surfactant 2023 and/or the alcohol and, for example, those proposed in the Japanese Patent Application No. 2003-19120 can be applied.

Figure 16:
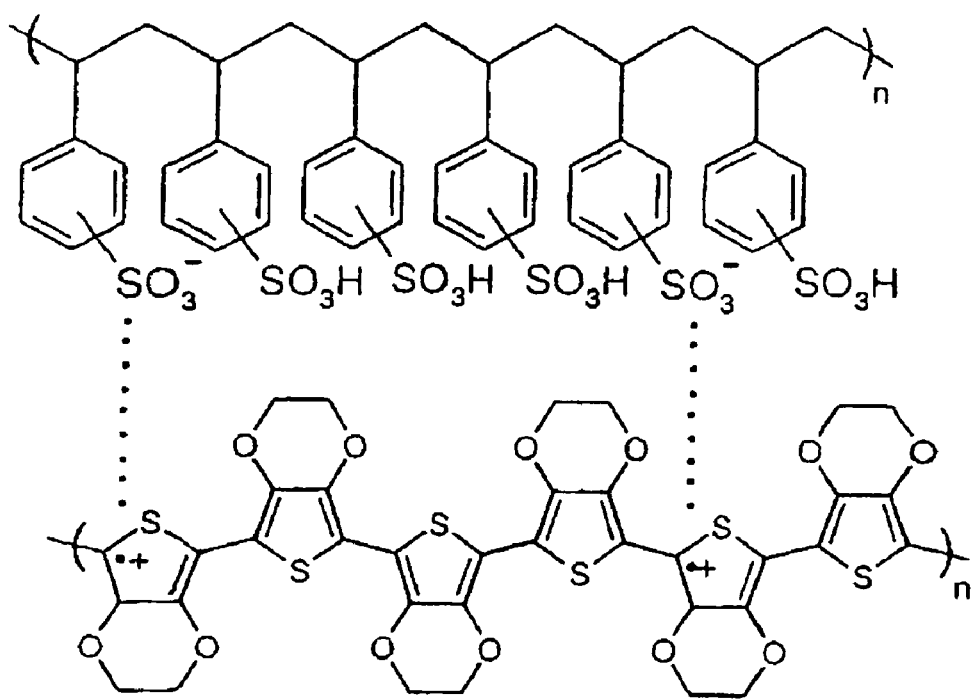
FIG. 16 is a schematic view showing an example of a molecular structure of a conductive conjugated polymer.

FIG. 16 is a schematic view showing an example of a molecular structure of a conductive conjugated polymer 2022 shown in FIG. 17B. The conductive conjugated polymer 2022 is poly(3,4-ethylenedioxythiophene)-poly(styrenesulfonic acid) (hereinafter referred to as PEDOT/PSS) and is obtained by doping poly(3,4-ethylenedioxythiophene) (hereinafter referred to as PEDOT) with polystyrenesulfonic acid (hereinafter referred to as PSS) as a dopant.

FIG. 17A is an explanatory view showing schematically PEDOT/PSS of a colloidal water dispersion, and FIG. 17B is an explanatory view showing schematically an example of a conductive polymer gel 2002 obtained by gelatinizing the colloidal water dispersion of PEDOT/PSS shown in FIG. 17A after the addition of a surfactant 2023.

As shown in FIG. 17A, in the colloidal water dispersion of PEDOT/PSS, PEDOT/PSS molecules are dispersed in water. When the surfactant 2023 is added to the colloidal water dispersion of PEDOT/PSS and the mixture is left to stand under the gelation conditions, as shown in FIG. 17B, a three-dimensional network is formed via the surfactant 2023 and the mixture is easily gelatinized while including water 2021 therein, and thus a conductive polymer gel 2002 is obtained.

It is believed that a gel is obtained by adding the surfactant 2023 (and/or an alcohol) to the colloidal water dispersion of PEDOT/PSS and leaving the mixture to stand under gelation conditions because a three-dimensional network is physically or chemically formed. It is considered that the resulting gel exhibits conductivity because of electronic conductivity and/or ionic conductivity. As a matter of course, this is not intended to be limited to such a way of thinking.

The conductive conjugated polymer 2022 includes, for example, at least one selected from polyacetylene, polyphenylene, polypyrrole, polythiophene, polyfuran, polyselenophene, polyisothianaphthene, polyphenylene sulfide, polyaniline, polyphenylenevinylene, polythiophenevinylene, poly-perinaphthalene, polyanthracene, polynaphthalene, polypyrene, polyazulene, and derivatives thereof. Among these polymers, polypyrrole or polythiophene shown in FIG. 16 is preferably used because it has high stability and high reliability and is easily available.

The conductive conjugated polymer 2022 is preferably doped with a dopant, whereby, the concentration of a carrier in the conductive polymer gel 2002 increases and conductivity can be improved.

The dopant includes, for example, at least one selected from iodine, arsenic fluoride, iron chloride, perchloric acid, sulfonic acid, perfluorosulfonic acid, polystyrenesulfonic acid, sulfuric acid, hydrochloric acid, nitric acid, and derivatives thereof. Among these dopants, polystyrenesulfonic acid is preferable because high conductivity can be easily adjusted.

Examples of the colloidal dispersion of the conductive conjugated polymer 2022 include a colloidal water dispersion of poly(3,4-ethylenedioxythiophene)-poly(styrenesulfonic acid) (hereinafter referred to as PEDOT/PSS) obtained by polymerizing 3,4-ethylenedioxythiophene in the presence of a catalyst such as iron (III) toluenesulfonate. The colloidal water dispersion is commercially available under the trade name of Baytron P (about 1.3 wt % dispersion of a conductive polymer (PEDOT/PSS), manufactured by Bayer Co.).

The surfactant 2023 is not specifically limited and there can be used at least one surfactant selected from known cationic surfactants, anionic surfactants, amphoteric surfactants, nonionic surfactants, and mixtures of two or more kinds thereof.

Examples of the cationic surfactant include quaternary alkylammonium salt and halogenated alkylpyridinium.

Examples of the anionic surfactant include alkylsulfuric acid or an ester salt, polyoxyethylene alkyl ether sulfuric acid or a salt thereof, alkylbenzenesulfonic acid or a salt thereof, alkylnaphthalenesulfonic acid or a salt thereof, alkylsulfosuccinic acid or a salt thereof, alkyldiphenyl ether disulfonic acid or a salt thereof, fatty acid or a salt thereof, and naphthalenesulfonic acid or a formalin condensate thereof.

Examples of the amphoteric surfactant include alkylbetaine, amine oxide, and hydrolyzed collagen.

Examples of the nonionic surfactant include polyoxyethylene alkyl ether, polyoxyalkylene alkyl ether, polyoxyethylene, sorbitan fatty acid ester, polyoxyethylene fatty acid ester, polyoxyethylene sorbitol fatty acid ester, polyoxyethylene fatty acid ester, polyoxyethylene hardened castor oil, polyoxyethylene alkylamine, alkylalkanolamide, and derivatives thereof.

Among these surfactants 2023, long-chain alkylbenzenesulfonic acid is used, particularly preferably, because gelation efficiency is improved.

The amount of the surfactant 2023 to be added to the conductive polymer gel is not specifically limited, but is preferably from 0.1 to 30 parts by weight, and more preferably from 0.5 to 10 parts by weight, based on 1 part by weight of the conductive polymer.

When the amount is less than 0.1 parts by weight, gelation may not occur. An amount of more than 30 parts by weight is not preferable because gelation may not occur, too.

The alcohol is not specifically limited and there can be used at least one alcohol selected from known monohydric alcohols and polyhydric alcohols, and mixtures of two or more kinds thereof.

Examples of the monohydric alcohol include branched or linear alcohols, such as ethanol, isopropyl alcohol, and butanol; cyclic alcohol, polymer-like alcohol, and mixtures of two or more kinds of them.

Examples of the polyhydric alcohol include glycols such as ethylene glycol and propylene glycol; chain polyhydric alcohols such as glycerin, erythritol, xylytol, and sorbitol; cyclic polyhydric alcohols such as glucose and sucrose; polymer-like polyhydric alcohols such as polyethylene glycol and polyvinyl alcohol; and mixtures of two or more kinds of them.

Among these alcohols, isopropyl alcohol, ethylene glycol and polyethylene glycol can be preferably used, and polyhydric alcohols such as ethylene glycol and polyethylene glycol are particularly preferable for the following reason. Ethylene glycol is used particularly preferably because it exerts an effect of causing gelation even at low concentration and also has no volatility. The molecular weight of polyethylene glycol is not specifically limited, but is preferably 1000 because gelation occurs even when the amount is less than that in the case of the molecular weight of 400.

The amount of the alcohol in the conductive polymer gel 2002 is not specifically limited, but is preferably from 1 to 70 parts by weight, and more preferably from 10 to 50 parts by weight, based on 1 part by weight of the conductive polymer. When the amount is less than 1 part by weight, gelation may not occur. An amount of more than 70 parts by weight is not preferable because viscosity of gel becomes too low and gelation may not occur, too.

The surfactant 2023 and the alcohol can be used alone, or used in combination in arbitrary ratio.

When using the surfactant 2023 in combination with the alcohol, the ratio thereof is not specifically limited.

The conductive conjugated polymer 2022 is gelatinized by using the surfactant 2023 and/or the alcohol by the following method.

The surfactant 2023 and/or the alcohol as the additive are added by pouring into a colloidal dispersion prepared by dispersing the conductive conjugated polymer 2022 in water 2021 in a colloidal state and/or a conductive conjugated polymer solution without forming bubbles.

Then, the mixture is left to stand in an open or closed space in a conventional atmospheric air for a predetermined time in a state free from vibration.

Consequently, a three-dimensional network is formed and the mixture is easily gelatinized, and thus a conductive polymer gel 2002 as a constituent gel of a toner 2001 is obtained in a stable manner.

The conductive conjugated polymer solution is obtained by dissolving the conductive conjugated polymer 2022 in water or an organic solvent. The conductive conjugated polymer colloidal dispersion and the conductive conjugated polymer solution can be used alone, or can also be used in combination in arbitrary ratio.

Examples of the conductive powder 2003 as a constituent component of the conductive paste 2001 include conductive carbon and metal powder.

As the conductive carbon, carbon black and acetylene carbon black produced by a furnace method and a channel method can be used, and commercially available conduction grade conductive carbon can be preferably used.

As the metal powder, a silver powder is preferably used and imparts excellent conductivity.

To control conductivity and soldering corrosion resistance, an alloy powder obtained by adding gold, platinum, palladium or rhodium to silver may be used.

It is preferred that the conductive powder 2003 be previously subjected to a surface treatment, thereby to improve dispersibility of the conductive powder 2003. Consequently, the conductive powder 2003 is uniformly dispersed in the resin binder 2004, thereby making it possible to eliminate variation in characteristics such as conductivity. As a treating agent of the conductive powder 2003, conventional surfactants and coupling agents can be used.

Examples of the resin binder 2004 as the constituent component of the conductive paste 2001 include crosslinkable resins such as phenol resin, melamine resin, urea resin, xylene resin, alkyd resin, unsaturated polyester resin, acrylic resin, polyimide resin, furan resin, urethane resin, and polyisocyanate resin; and thermoplastic resins such as polyethylene, polypropylene, polyester, ABS resin, methyl polymethacrylate, polyvinyl chloride, polyvinylidene chloride, polyvinyl acetate, polyvinyl alcohol, polyacetal, polycarbonate, polyester, polyphenylene oxide, polysulfone, polyimide, polyether sulfone, polyallylate, polyether ketone, polyethylene tetrafluoride, and silicone resin. One or more kinds selected from these resin binders can be used.

When using crosslinking resins, known curing agents and curing catalysts may be appropriately used.

Since the solvent is usually added to the conductive paste 2001 so as to adjust the viscosity, the resulting solution can be applied to the base material such as resin film or substrate by a conventional printing technique.

As the solvent, known solvents can be used. In particular, a solvent having a boiling point of 250° C. or lower can be preferably used because the solvent is nearly vaporized without leaving a residue when the conductive paste 2001 is cured by heating.

Examples of the solvent include hydrocarbon solvents such as toluene, cyclohexane, methylcyclohexane, n-hexane, and pentane; alcohols such as isopropyl alcohol and butylalcohol; ketones such as cyclohexanone, methyl ethyl ketone, methyl isobutyl ketone, diethyl ketone, and isophorone; esters such as ethyl acetate, propyl acetate, and butyl acetate; glycol monoethers such as ethylene glycol monomethyl ether, propylene glycol monoethyl ether, diethylene glycol monomethyl ether, and 3-methoxy-3-methylbutyl acetate, and acetates thereof; and mixtures of one or more kinds thereof.

In the case in which a thermosetting crosslinking resin and a thermoplastic resin are contained as the resin binder 2004, the conductive paste 2001 can be cured by heating after applying to the base material. As a heating means, a heating means using a heater is used alone, or in combination with a means of applying infrared light or high frequency.

In the case in which a photocurable crosslinking resin is contained as the resin binder 2004, the conductive paste 2001 can be cured by irradiating with an electromagnetic wave such as microwaves, infrared light, visible light, ultraviolet light, vacuum ultraviolet light, X-rays, or electron beams after being applied to the base material.

In the same manner as described above, the conductive paste 2001 can be cured to form wiring.

The conductive paste 2001 is produced by mixing constituent components such as conductive polymer gel 2002, conductive powder 2003 and resin binder 2004 using a known stirrer.

For example, there can be used a method of mixing the constituent components of the conductive paste 2001 with stirring using a stirrer such as a homogenizer, and kneading the resulting mixture using a kneading machine such as a triple roller or a kneader, thereby to disperse the constituent components more uniformly to obtain a conductive paste 2001.

To uniformly disperse the constituent components, the constituent components may be mixed while applying ultrasonic waves or high frequency, or mixed while applying a pressure in a stirrer or kneading machine and varying the applied pressure.

Since the conductive paste 2001 contains the conductive powder 2003 such as metal powder, and the conductive polymer gel 2002 as the conductive material, the content of the conductive powder 2003 required to obtain sufficient conductivity can be reduced as compared with the prior art. Since the content of the metal component (conductive powder 2003) can be reduced as compared with the prior art, the environmental burden can be reduced upon disposal of the printed circuit board and electronic parts which employ the conductive paste 2001.

A ratio of the sum total of the content (G) in the conductive polymer gel 2002 and the content of a carbon component ($C_p$) in the conductive powder 2003 (G+$C_p$) to the sum total of the content (G) of the conductive polymer gel 2002 in the conductive paste 2001 and the content (P) of the conductive powder 2003 (G+P), ((G+$C_p$)/(G+P)), is preferably 0.07 or more, more preferably from 0.13 to 0.24, and most preferably 0.5 or more.

The ratio (G+$C_p$)/(G+P) represents the proportion of an organic compound component such as carbon other than the metal component among the conductive materials, and the environmental burden can be reduced by controlling the proportion to 0.07 or more.

A ratio of the sum total of the content (G) of the conductive polymer gel 2002 and the content (P) of the conductive powder 2003 (P+G) to the content B of the resin binder 2004, ((G+P)/B), is preferably from 3/7 to 9/1, and more preferably from 4 to 6.

The ratio (G+P)/B represents a ratio of the conductive material to the resin binder 2004. When the ratio (G+P)/B is 3/7 or more, conductivity required of the conductive paste 2001 is achieved and wirings and electrodes having sufficient conductivity can be formed by using the conductive paste 2001, and also bonding of terminals and lead wires of electronic parts can be conducted.

When the ratio (G+P)/B is 9/1 or less, sufficient integrity can be achieved and it is made possible to form wirings and electrodes, which are less likely to be peeled off, using the conductive paste 2001.

The conductive powder 2003 is generally made of an inorganic compound such as metal powder and is inferior in compatibility with a resin binder (organic compound) 2004. Therefore, when the content of the conductive powder 2003 in the conductive paste 2001 is large and the content of the resin binder 2004, like the prior art, the conductive powder 2003 is hardly miscible with the resin binder 2004, thereby causing phase separation, and thus integrity of the conductive paste 2001 to the base material and flexibility drastically deteriorate. Therefore, in the case in which wiring is formed by applying the conductive paste 2001 to the base material and curing the conductive paste, the wiring is peeled off from the base material. Also because of poor flexibility, when the base material is bent, the wiring is broken at the bending portion of the base material.

In contrast, according to the present invention, since the conductive polymer gel 2002 is a polymer, like the resin binder 2004, molecules thereof are entangled with the surface of the conductive powder 2003, thereby retaining the conductive powder 2003. As described above, since the conductive polymer gel 2002 serves as a conductive material, the content of the conductive powder 2003 can be reduced by the amount of the conductive polymer gel 2002.

Consequently, it is made possible to suppress phase separation between the conductive powder 2003 and the resin binder 2004, as compared with the prior art, and thus integrity of the conductive paste 2001 to the base material and flexibility can be improved. Therefore, wiring formed by using the conductive paste 2001 is excellent in integrity with the base material and is less likely to be peeled off. Also because of excellent flexibility, the wiring is less likely to be broken at the bending portion of the base material when the base material is bent.

Furthermore, since the content of the metal component (conductive powder 2003) is small as compared with the prior art, the environmental burden can be reduced upon disposal of the printed circuit board.

The conductive polymer gel 2002 is the same polymer compound (organic compound) as the resin binder 2004, and is easily miscible and is also excellent in compatibility. Therefore, the conductive polymer gel 2002 and the resin binder 2004 can be uniformly mixed to easily obtain a conductive paste 2001.

The technical scope of the present invention is not limited to the above embodiments and various modifications can be made without departing from the scope of the present invention.

According to the purposes, the conductive paste 2001 does not contain the conductive powder 2003 and may be composed of the conductive polymer gel 2002 and the resin binder 2004. Since conductivity is imparted even if the conductive material in the conductive paste 2001 is only the conductive polymer gel 2002, pattern wiring can be formed by applying the conductive paste 2001 to the base material and curing the conductive paste with heating.

The conductive paste 2001 may contain fillers such as silica, alumina, mica, and carbon powder; colorants such as pigments and dyes; and auxiliaries such as polymerization inhibitors, antioxidants, thickeners, thixotropic agents, suspending agents, and dispersants.

Each content of the fillers, colorants and auxiliaries is preferably 35% by weight or less based on the sum total of the conductive polymer gel 2002, the conductive powder 2003 and the resin binder 2004. Consequently, the above operation and effect of the present invention is not adversely affected

[Second conductive functional member, second printed circuit member]

The second conductive functional member and the second printed circuit member 2005 according to the present invention will now be described.

The second conductive functional member of the present invention comprises a sheet-like base material made of a resin film of PET (polyethylene terephthalate) or paper, and a conductive portion made of a conductive paste provided on at least one surface of the base material.

The conductive portion was formed by transferring and fixing the conductive paste 2001 onto the base material. Detailed description of the conductive paste 2001 is omitted because it is as described hereinabove.

The method for formation of the conductive portion includes, for example, a method of applying the conductive paste 2001 of the present invention on the base material to form a predetermined pattern by a known printing technique such as screen printing, and curing while heating or irradiating with electromagnetic waves such as light.

The base material is not limited to a sheet-like base material and may be any member on which the conductive paste 2001 can be applied and cured.

As described above, the conductive paste 2001 can be applied and cured on the base material by a known printing technique and a fine conductive portion can be formed with high accuracy.

The shape of the conductive portion is not specifically limited and examples thereof include linear or planar conductive paste 2001 which is applied and cured on at least one surface of the base material.

The linear shape refers to a shape of one or plural straight lines or curved line, for example, pattern shape such as wavy shape, straight line, curved line, coil shape, polygon such as triangle or quadrangle, circle, ellipse, and shape, letter and symbol of a combination thereof. A planar conductive portion can be formed by forming plural linear conductive portions without pitches (intervals).

Examples of the planar conductive portion include a conductive portion whose one surface has a shape, for example, polygon such as triangle or quadrangle, circle, ellipse, and shape and symbol of a combination thereof.

The conductive portion is not limited to those formed on the surface of the base material and may be those formed by applying and curing the conductive paste 2001 inside the pore portion, recessed portion or groove provided on the base material.

Therefore, a conductive portion having a one-, two- or three-dimensional shape can be formed by using linear conductive portions alone or in combination. For example, a conductive portion having a one-dimensional shape can be used as wiring and a conductive portion having a two-dimensional shape can be used as a pattern wiring, an electrode, an electromagnetic coil, and an antenna. A conductive portion having a three-dimensional shape can be used as a through electrode.

Impedance characteristics and conductivity can be controlled by appropriately selecting the thickness, width, length and shape of the conductive portion, and the second conductive functional member can be used for various purposes which utilize the conductivity of the conductive portion.

The second conductive functional member can be used as a wiring substrate and can be applied to various electronic equipments by mounting various electronic parts such as light emitting devices and IC chip on the base material. It can also be used as an IC tag and an IC label.

The conductive paste 2001 contains the conductive polymer gel 2002 and the conductive polymer gel 2002 is the same polymer compound (organic compound) as an resin binder 2004, and is easily miscible and is also excellent in compatibility, and thus the conductive polymer gel 2002 and the resin binder 2004 are uniformly mixed to obtain a conductive paste 2001.

The conductive paste 2001 obtained by uniformly mixing the constituent components has a nearly constant viscosity, and thus pattern wiring having uniform thickness and uniform line width can be easily formed with good accuracy when the conductive paste 2001 is applied to the base material. Therefore, it is made possible to realize the second conductive functional member having a conductive portion, which has less variation in electrical characteristics such as impedance characteristics.

The conductive portion formed by curing the conductive paste 2001 is excellent in integrity with the base material and is less likely to be peeled off. Also, because of excellent flexibility, the conductive portion is less likely to be broken at the bending portion of the base material when the base material is bent.

The second printed circuit member of the present invention is an example of the second conductive functional member, and the conductive portion provided on the sheet-like base material has a linear form.

The linear conductive portion is used as a pattern wiring, an electrode, a through electrode, an electromagnetic coil, and an antenna. Therefore, the second printed circuit member can be used as a wiring substrate, an IC tag, and an IC label.

As described above, since the conductive portion formed by curing the conductive paste 2001 is excellent in flexibility, even in the case in which a second printed circuit board comprising a base material composed of a flexible resin sheet made of PET abase material, which is used by bending the base material, like a membrane circuit board of a keyboard, wiring is less likely to be broken at the bending portion of the base material. Therefore, it can be preferably used.

Figure 18:
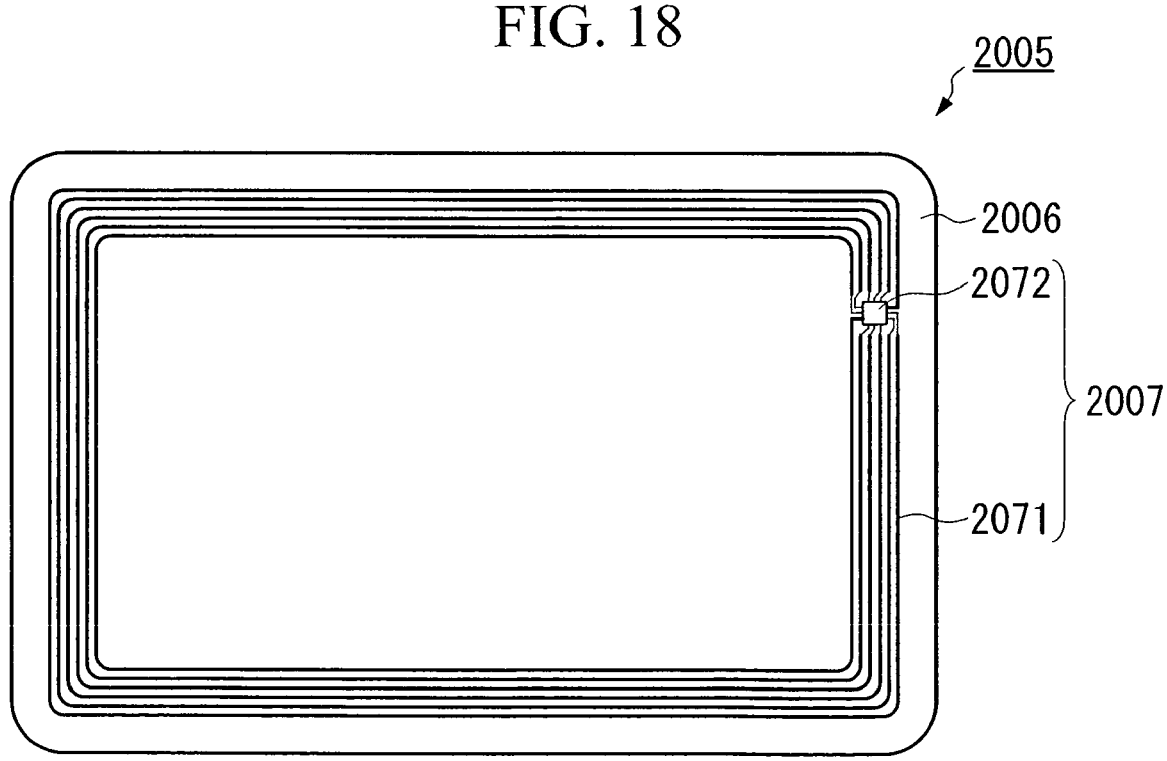
FIG. 18 is a plan view showing an example of a second printed circuit member according to the present invention.

FIG. 18 is a plan view showing a non-contact type IC media as an example of the second printed circuit member.

The non-contact type IC media (hereinafter expressed by the same reference symbol 2005 as that of the second printed circuit member) comprises a base material 2006 made of a resin film of PET (polyethylene terephthalate) or a paper, and an RF-ID module 2007 (RF-ID: Radio Frequency-Identification) provided on the base material 2006.

The RF-ID module 2007 comprises an antenna coil 2071 composed of pattern wiring (linear conductive portion) formed by winding once or plural times in the form of a planar coil on the base material 2006, and an IC chip 2072 connected to the antenna coil 2071.

The pattern wiring (conductive portion), which serves as the antenna coil 2071, is formed by applying the conductive paste 2001 to the base material 2006 and curing the conductive paste.

The method for formation of the antenna coil 2071 includes, for example, a method of applying the conductive paste 2001 of the present invention on the base material 2006 to form a predetermined pattern, which serves as the antenna coil 2071, by a known printing technique such as screen printing, and curing while heating or irradiating with electromagnetic waves such as light.

Radio communication can be conducted by the antenna coil 2071. For example, received data are stored in the IC chip 2072 and also data stored in the IC chip 2072 can be transmitted to a receiver of an external reader/writer.

The antenna coil 2071 is not limited to an antenna coil composed of a linear conductive portion having a two-dimensional shape such as planar coil shown in FIG. 18, and may be an antenna coil composed of a linear conductive portion having a three-dimensional shape such as a spiral formed inside a through hole provided on the base material 2006 and both surfaces of the base material 2006.

The antenna is not limited to a coil-shaped antenna such as antenna coil 2071 and may be any antenna composed of a linear conductive portion having a shape capable of receiving and transmitting an electric wave having a predetermined frequency. Examples thereof include a bipolar antenna composed of a linear conductive portion having a one-dimensional shape such as linear shape or a plygonal shape such as a triangle, and an antenna composed of a planar conductive portion formed by forming plural linear conductive portions without pitches (intervals).

Examples of the non-contact type IC media 2005 include a non-contact type IC tag 5 comprising a sheet-like base material 2006 such as a card, label, postcard, or envelope and an RF-ID module 2007 provided on the base material, and those comprising a base material 2006 such as an IC label or corrugated board, and an RF-ID module 2007 provided on at least one surface of the base material.

Embodiment of Fuel Cell

A fuel cell comprises a power generation portion composed of one or more cells stacked with each other, each cell (single cell or unit cell) comprising at least a first electrode (hereinafter referred to as a fuel electrode), a second electrode (hereinafter referred to as an air electrode) and an electrolyte interposed between the electrodes.

The power generation portion is provided with a gas feeding mechanism, which feeds a hydrogen gas to a fuel electrode and feeds an oxygen gas to an air electrode, and a connection portion which is electrically connected to the fuel electrode and the air electrode and connects a power generation portion to an external circuit board.

Figure 19:
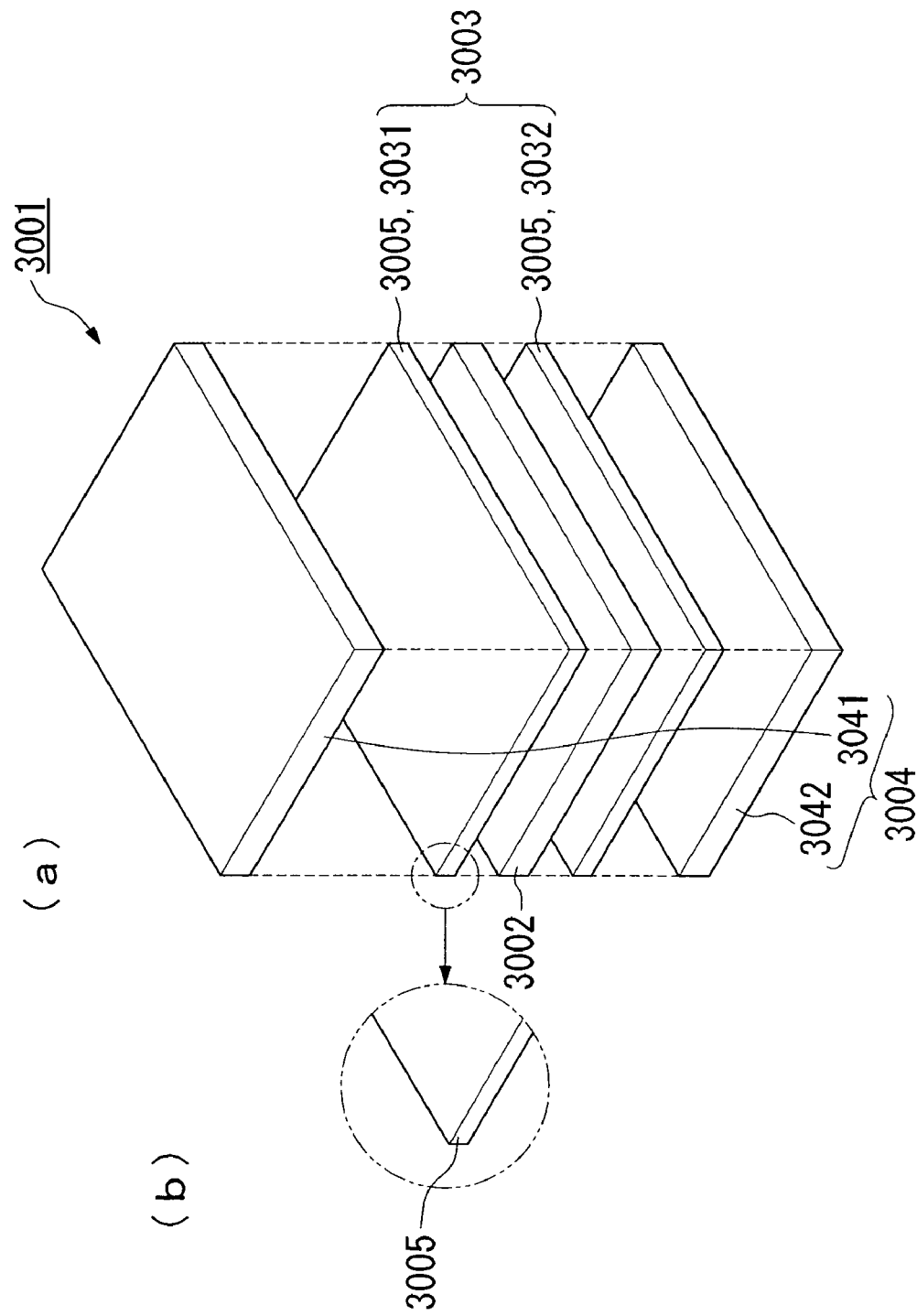
FIG. 19 is a schematic view showing an example of a cell of a fuel cell according to the present invention.

FIG. 19 is a schematic view showing a fuel cell 3001 according to an embodiment of the present invention. The fuel cell is a polymer electrolyte type fuel cell (hereinafter also referred to as PEFC) and the cell 3001 comprises a polymer electrolyte film 3002, a fuel electrode (negative electrode) 3031 provided at both sides of the polymer electrolyte film 3002, and an air electrode (positive electrode) 3032.

In the fuel electrode 3031 and the air electrode 3032, each side facing outside (the other principal plane opposite to one principal plane contacted with the polymer electrolyte film 3002, among two principal planes) is provided with a separator (pass partition plate) 3004 and the polymer electrolyte film 3002, the fuel electrode 3031 and the air electrode 3032 are interposed between a pair of separators 3004.

A hydrogen gas is fed between a separator 3041 and a fuel electrode 3031 at the fuel electrode side, while an oxygen gas is fed between a separator 3042 and an air electrode 3032 at the air electrode side. On the surface of the separator 3004, a groove (not shown), which serves as a passage of a gas, is provided.

The polymer electrolyte film 3002 is a proton-conductive solid polymer film and examples thereof include proton-conductive ion exchange films such as perfluorosulfonic acid film (manufactured by Dupont under the trade name of Nafion).

Figure 21A:
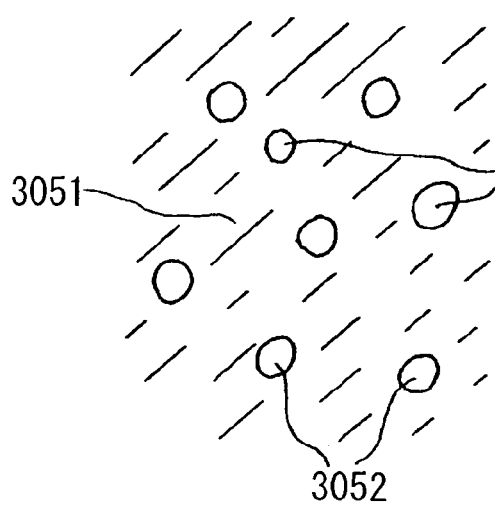
FIG. 21A is an explanatory view showing schematically a colloidal water dispersion of PEDOT/PSS.
Figure 21B:
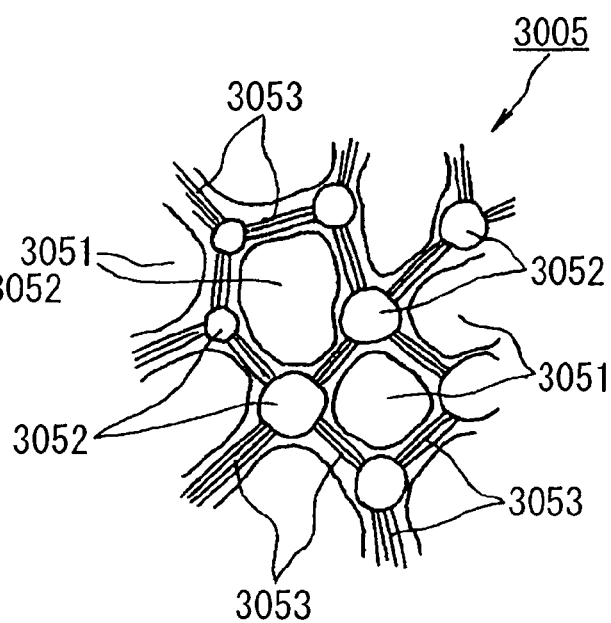
FIG. 21B is an explanatory view showing schematically an example of a conductive polymer gel according to the present invention.

As shown in FIG. 21B described hereinafter, the fuel electrode 3031 and the air electrode 3032 comprises a conductive polymer gel 3005 containing water 3051, as a main component, a conductive conjugated polymer 3052, and a surfactant 3053 and/or an alcohol.

The conductive polymer gel 3005 is formed by gelatinizing the conductive conjugated polymer 3052 by the surfactant 3053 and/or the alcohol, and those proposed in Japanese Patent Application No. 2003-19120 can be applied. The conductive polymer gel 3005 is a gel having conductivity and also has properties which are different from those of a fluid which has high viscosity but flows. Also the conductive polymer gel has a proper strength and can retain its shape, and is also used as an electrode 3003 after being formed into a sheet-like material or a thin film.

Among the fuel electrode 3031 and the air electrode 3032, only one electrode 3003 may be composed of the conductive polymer gel 3005.

Figure 20:
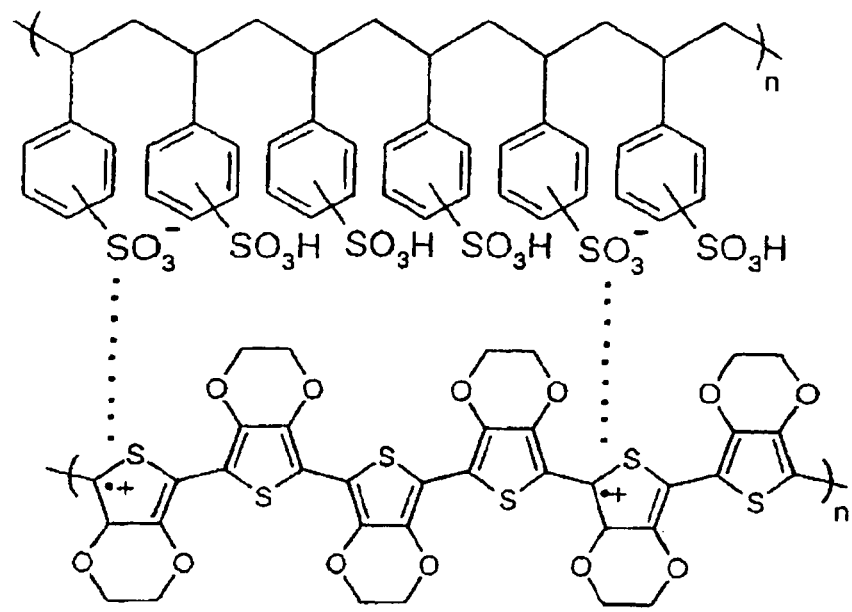
FIG. 20 is a schematic view showing an example of a molecular structure of a conductive conjugated polymer.

FIG. 20 is a schematic view showing an example of a molecular structure of the conductive conjugated polymer 3005 shown in FIG. 21B. The conductive conjugated polymer 3052 is poly(3,4-ethylenedioxythiophene)-poly(styrenesulfonic acid) (hereinafter referred to as PEDOT/PSS) and is obtained by doping poly(3,4-ethylenedioxythiophene) (hereinafter referred to as PEDOT) with polystyrenesulfonic acid (hereinafter referred to as PSS) as a dopant.

FIG. 21A is an explanatory view showing schematically a colloidal water dispersion of PEDOT/PSS, and FIG. 21B is an explanatory view showing schematically a conductive polymer gel 3005 of the present invention obtained by adding a surfactant 3053 to the colloidal water dispersion of PEDOT/PSS shown in FIG. 21A and gelatinizing the mixture.

As shown in FIG. 21A, in the colloidal water dispersion of PEDOT/PSS, PEDOT/PSS molecules are dispersed in water 3051. When the surfactant 3053 is added to the colloidal water dispersion of PEDOT/PSS and the mixture is left to stand under the gelation conditions, as shown in FIG. 21B, a three-dimensional network is formed via the surfactant 3053 and is easily gelatinized while including water 3051 therein, and thus a conductive polymer gel 3005 is obtained.

It is believed that a gel is obtained by adding the surfactant 3053 (and/or an alcohol) to the colloidal water dispersion of PEDOT/PSS and leaving the mixture to stand under gelation conditions because a three-dimensional network is physically or chemically formed. It is believed that the resulting gel exhibits conductivity because of electronic conductivity and/or ionic conductivity. As a matter of course, this is not intended to be limited to such a way of thinking.

The conductive conjugated polymer 3052 includes, for example, at least one selected from polyacetylene, polyphenylene, polypyrrole, polythiophene, polyfuran, polyselenophene, polyisothianaphthene, polyphenylene sulfide, polyaniline, polyphenylenevinylene, polythiophenevinylene, poly-perinaphthalene, polyanthracene, polynaphthalene, polypyrene, polyazulene, and derivatives thereof. Among these polymers, polypyrrole or polythiophene shown in FIG. 20 is preferably used because it has high stability and high reliability and is readily available.

The conductive conjugated polymer 3052 is preferably doped with a dopant, whereby, the concentration of a carrier in the conductive polymer gel 3005 increases and conductivity can be improved.

The dopant includes, for example, at least one selected from iodine, arsenic fluoride, iron chloride, perchloric acid, sulfonic acid, perfluorosulfonic acid, polystyrenesulfonic acid, sulfuric acid, hydrochloric acid, nitric acid, and derivatives thereof. Among these dopants, polystyrenesulfonic acid is preferable because high conductivity can be easily adjusted.

Examples of the colloidal dispersion of the conductive conjugated polymer 3052 include a colloidal water dispersion of poly(3,4-ethylenedioxythiophene)-poly(styrenesulfonic acid) (hereinafter referred to as PEDOT/PSS) obtained by polymerizing 3,4-ethylenedioxythiophene in the presence of a catalyst such as iron (III) toluenesulfonate. The colloidal water dispersion is commercially available under the trade name Baytron P (about 1.3 wt % dispersion of a conductive polymer (PEDOT/PSS), manufactured by Bayer Co.).

The surfactant 3053 is not specifically limited and there can be used at least one surfactant selected from known cationic surfactants, anionic surfactants, amphoteric surfactants, nonionic surfactants, and mixtures of two or more kinds thereof.

Examples of the cationic surfactant include quaternary alkylammonium salt and halogenated alkylpyridinium.

Examples of the anionic surfactant include alkylsulfuric acid or an ester salt, polyoxyethylene alkyl ether sulfuric acid or a salt thereof, alkylbenzenesulfonic acid or a salt thereof, alkylnaphthalenesulfonic acid or a salt thereof, alkylsulfosuccinic acid or a salt thereof, alkyldiphenyl ether disulfonic acid or a salt thereof, fatty acid or a salt thereof, and naphthalenesulfonic acid or a formalin condensate thereof.

Examples of the amphoteric surfactant include alkylbetaine, amine oxide, and hydrolyzed collagen.

Examples of the nonionic surfactant include polyoxyethylene alkyl ether, polyoxyalkylene alkyl ether, polyoxyethylene, sorbitan fatty acid ester, polyoxyethylene fatty acid ester, polyoxyethylene sorbitol fatty acid ester, polyoxyethylene fatty acid ester, polyoxyethylene hardened castor oil, polyoxyethylene alkylamine, alkylalkanolamide, and derivatives thereof.

Among these surfactants 3053, long-chain alkylbenzenesulfonic acid is used, particularly preferably, because gelation efficiency is improved.

The amount of the surfactant 3053 to be added to the conductive polymer gel 3005 is not specifically limited, but is preferably from 0.1 to 30 parts by weight, and more preferably from 0.5 to 10 parts by weight, based on 1 part by weight of the conductive polymer. When the amount is less than 0.1 parts by weight, gelation may not occur. The amount of more than 30 parts by weight is not preferable because gelation may not occur, too.

The alcohol is not specifically limited and there can be used at least one alcohol selected from known monohydric alcohols and polyhydric alcohols, and mixtures of two or more kinds thereof.

Examples of the monohydric alcohol include branched or linear alcohols, such as ethanol, isopropyl alcohol, and butanol; cyclic alcohol, polymer-like alcohol, and mixtures of two or more kinds thereof.

Examples of the polyhydric alcohol include glycols such as ethylene glycol and propylene glycol; chain polyhydric alcohols such as glycerin, erythritol, xylytol, and sorbitol; cyclic polyhydric alcohols such as glucose and sucrose; polymer-like polyhydric alcohols such as polyethylene glycol and polyvinyl alcohol; and mixtures of two or more kinds thereof.

Among these alcohols, isopropyl alcohol, ethylene glycol and polyethylene glycol can be preferably used, and polyhydric alcohols such as ethylene glycol and polyethylene glycol are particularly preferable by the following reason. Ethylene glycol is used particularly preferably because it exerts an effect of causing gelation even at low concentration and also has no volatility. The molecular weight of polyethylene glycol is not specifically limited, but is preferably 1000 because gelation occurs even when the amount is less than that in case of the molecular weight of 400.

The amount of the alcohol in the conductive polymer gel 3005 is not specifically limited, but is preferably from 1 to 70 parts by weight, and more preferably from 10 to 50 parts by weight, based on 1 part by weight of the conductive polymer. When the amount is less than 1 part by weight, gelation may not occur. An amount of more than 70 parts by weight is not preferable because viscosity of gel becomes too low and gelation may not occur, too.

The surfactant 3053 and the alcohol can be used alone, or be used in combination in arbitrary ratio.

When using the surfactant 3053 in combination with the alcohol, the ratio thereof is not specifically limited.

The conductive conjugated polymer 3052 is gelatinized by using the surfactant 3053 and/or the alcohol by the following method.

The surfactant 3053 and/or the alcohol as the additive are added by pouring into a colloidal dispersion prepared by dispersing the conductive conjugated polymer 3052 in water 3051 in a colloidal state and/or a conductive conjugated polymer solution without forming bubbles.

Then, the mixture is left to stand in an open or closed space in a conventional atmospheric air for a predetermined time in a state free from vibration.

Consequently, a three-dimensional network was formed and the mixture was easily gelatinized, and thus a conductive polymer gel 3005 is obtained in a stable manner.

The conductive conjugated polymer 3052 solution is obtained by dissolving the conductive conjugated polymer 3052 in water or an organic solvent. The conductive conjugated polymer colloidal dispersion and the conductive conjugated polymer solution can be used alone, or can also be used in combination in arbitrary ratio.

The method of forming the fuel electrode 3031 and the air electrode 3032 by using the conductive polymer gel 3005 includes, for example, a method of forming the conductive polymer gel 3005 into a sheet having a predetermined thickness by the method described above, and providing the sheet at both ends of a polymer electrolyte film 3002 to form the fuel electrode 3031 and the air electrode 3032.

In the fuel electrode 3031 composed of the conductive polymer gel 3005, the hydrogen gas fed is dissolved and incorporated into water 3051 included in the conductive polymer gel 3005. Hydrogen (molecules) dissolved in water 3051 of the conductive polymer gel 3005 is electrolytically dissociated to produce hydrogen ions and electrons according to the scheme (X).

$$H_2 \rightarrow 2H^+ + 2e^- \tag{X}$$

Electrons produced by dissociation of hydrogen propagate through the conductive conjugated polymer 3052 in the conductive polymer gel 3005 and flow through an external circuit board (not shown) connected to the cell 3001 to reach the air electrode 3032 of the cell 3001.

Hydrogen ions produced by dissociation of hydrogen move in water 3051 included in the conductive polymer gel 3005 toward the polymer electrolyte film 3002. Hydrogen ions move in the polymer electrolyte film 3002 toward the air electrode 3032, together with water.

In the air electrode 3032 composed of the conductive polymer gel 3005, the oxygen gas fed is dissolved and incorporated into water 3051 included in the conductive polymer gel 3005.

Electrons produced in the fuel electrode 3031 flow through an external circuit board (not shown) from the fuel electrode 3031 to the air electrode 3032 of the cell 3001, and propagate through the conductive conjugated polymer 3052 in the conductive polymer gel 3005. Hydrogen ions move in water 3051 of the conductive polymer gel 3005.

In the conductive polymer gel 3005 of the air electrode 3032, oxygen (molecules), hydrogen ions and electrons react with each other to produce water according to the following scheme (Y).

As described above, electron exchange is conducted in the fuel electrode 3031 and the air electrode 3032, whereby, an electric current is discharged from the cell 3001.

$$2H^+ + 2e^- + (\tfrac{1}{2})O_2 \rightarrow H_2O \tag{Y}$$

Since the fuel electrode 3031 comprises at least the conductive polymer gel 3005, it is made possible to dissociate the hydrogen gas into hydrogen ions and electrons by dissolving in water 3051 included in the conductive polymer gel 3005. Therefore, it is not necessary to dissociate the hydrogen gas into hydrogen ions by using a catalyst layer made of platinum or a platinum alloy, like in the prior art.

Since the air electrode 3032 cntains at least the conductive polymer gel 3005, it is made possible to dissolve and incorporate the oxygen gas into water 3051 included in the conductive polymer gel 3005. Therefore, it is not necessary to adsorb the oxygen gas using a catalyst layer made of platinium or a platinum alloy, like in the prior art.

As described above, it is not necessary to use the catalyst layer made of platinum or a platinum alloy, like in the prior art, and thus an inexpensive electrode 3003 can be realized and the production cost of a fuel cell can be reduced by using the electrode 3003.

Since the conductive polymer gel 3005 has proper strength and also has conductivity, it is not necessary that the fuel electrode 3031 and the air electrode 3032 have a two-layered structure of a supporting layer and a catalyst layer, like in the prior art, and the electrodes can be formed only of the conductive polymer gel 3005.

Usually, the power generation portion of the cell has a stacked structure obtained by stacking plural cells 3001, thereby achieving high electromotive force. Therefore, when the thickness of the fuel electrode 3031 and the air electrode 3032 of the cell 3001 can be reduced, the thickness of the power generation portion is markedly reduced, thus making it possible to reduce the thickness and size of the fuel cell.

The thickness of the thin film of the conductive polymer gel 3005, which constitutes the electrode 3003, is preferably from 0.01 to 50 μm, and thus the thin film of the conductive polymer gel 3005 has proper strength and can retain the shape. Therefore, it is made possible to ensure sufficient contact area between the hydrogen gas or oxygen gas and water 3051 included in the conductive polymer gel 3005, and to dissolve and incorporate the hydrogen gas or oxygen into water 3051.

Since the electrode 3003 is made of the conductive polymer gel 3005, a problem such as separation of two layers does not occur, like the two-layered structure of the catalyst layer and the supporting layer of the prior art, and excellent long-term stability can be achieved.

Furthermore, like the case of using a catalyst layer made of platinum or a platinum alloy of the prior art, a discharge voltage and a current value are not decreased by an influence of carbon monoxide and approximately fixed voltage and current values can be stably obtained.

Although hydrogen ions move in water 3051 in a conductive polymer gel 3005, ionic conductivity of water is excellent as compared with solid catalyst layer made of platinum or a platinum alloy of the prior art, and thus rapid movement (diffusion) of hydrogen ions can be conducted.

Therefore, the oxidation reaction in the fuel electrode 3031 and the reductive reaction in the air electrode 3032 can be conducted at a high reaction rate, whereby, power loss of the cell 3001 can be reduced and high discharge voltage (electromotive force) can be achieved.

EXAMPLES

The present invention will be described in detail by the following Examples and Comparative Examples. However, the present invention is not limited to these Examples.

<Gelation by Addition of Surfactant (Standing in Closed State)>

Examples 1 to 4 and Comparative Examples 1 to 2 describe the case where gelation is conducted by standing in an open state after the addition of a surfactant.

Example 1

In this example, 100 parts by weight of a conductive conjugated polymer colloidal dispersion PEDOT/PSS (about 1.3 wt % colloidal water dispersion of a conductive polymer (PEDOT/PSS) manufactured by Bayer Co. under the trade name Baytron P) was mixed with 0.7 parts by weight of dodecylbenzenesulfonic acid ($C_{12}H_{25}C_6H_4SO_3H$) (hereinafter also referred to as DBS) as an additive and, after stirring for about 10 minutes, the mixture was left to stand at a standing temperature of 10° C., 25° C. and 50° C. in a closed state for one day to obtain samples gelatinized at different standing temperatures.

With respect to the samples obtained at each standing temperature, the gelation degree was examined. The gelation degree was evaluated by the following three-rank criteria (represented by the symbols ○, Δ and ×).
○: solidified to obtain a self-supporting gel
Δ: not solidified, but high viscosity
×: not correspond to the above two criteria (○, Δ)

In the case in which the gel corresponding to the criterion represented by the symbol ○ was obtained, the conductivity of the gel was examined by using a sample obtained at the standing temperature of 50° C. The evaluation results of the gelation degree and the measurement results of the conductivity are shown in Table 1. In Table 1, the symbol "−" denotes the conductivity smaller than a measurement limit value and the symbol "+" denotes the case where the conductivity was not measured because gelation did not occur.

Example 2

In this example, the operation was conducted in the same manner as in Example 1, except that the amount of DBS to be mixed as the additive was changed to 1.0 part by weight, and then the mixture was left to stand at a standing temperature of 10° C., 25° C. and 50° C. in a closed state for one day to obtain samples gelatinized at different standing temperatures.

With respect to the respective samples obtained in this example, the gelation degree was evaluated and the conductivity was measured in the same manner as in Example 1. The evaluation results of the gelation degree and the measurement results of the conductivity are shown in Table 1.

Example 3

In this example, the operation was conducted in the same manner as in Example 1, except that the amount of DBS to be mixed as the additive was changed to 2.0 parts by weight, and then the mixture was left to stand at a standing temperature of 10° C., 25° C. and 50° C. in a closed state for one day to obtain samples gelatinized at different standing temperatures.

With respect to the respective samples obtained in this example, the gelation degree was evaluated and the conductivity was measured in the same manner as in Example 1. The evaluation results of the gelation degree and the measurement results of the conductivity are shown in Table 1.

Example 4

In this example, the operation was conducted in the same manner as in Example 1, except that the amount of DBS to be mixed as the additive was changed to 10 parts by weight, and then the mixture was left to stand at a standing temperature of 10° C., 25° C. and 50° C. in a closed state for one day to obtain samples gelatinized at different standing temperatures.

With respect to the respective samples obtained in this example, the gelation degree was evaluated and the conductivity was measured in the same manner as in Example 1. The evaluation results of the gelation degree and the measurement results of the conductivity, are shown in Table 1.

Comparative Example 1

In this example, the operation was conducted in the same manner as in Example 1, except that DBS was not mixed as the additive (amount of DBS=0 part by weight), and then the mixture was left to stand at a standing temperature of 10° C., 25° C. and 50° C. in a closed state for one day to obtain samples gelatinized at different standing temperatures.

With respect to the respective samples obtained in this example, the gelation degree was evaluated and the conductivity was measured in the same manner as in Example 1. The evaluation results of the gelation degree and the measurement results of the conductivity are shown in Table 1.

Comparative Example 2

In this example, the operation was conducted in the same manner as in Example 1, except that the amount of DBS to be mixed as the additive was changed to 0.5 parts by weight, and then the mixture was left to stand at a standing temperature of 10° C., 25° C. and 50° C. in a closed state for one day to obtain samples gelatinized at different standing temperatures.

With respect to the respective samples obtained in this example, the gelation degree was evaluated and the conductivity was measured in the same manner as in Example 1. The evaluation results of the gelation degree and the measurement results of the conductivity are shown in Table 1.

TABLE 1

| | Additive (parts by weight) | Evaluation results of gelation degree Standing temperature (° C.) | | | Measurement results of conductivity |
|---|---|---|---|---|---|
| | DBS | 10 | 25 | 50 | (mS/cm) |
| Example 1 | 0.7 | X | X | ○ | 0.5 |
| Example 2 | 1.0 | Δ | Δ | ○ | 1.5 |
| Example 3 | 2.0 | ○ | ○ | ○ | 20 |
| Example 4 | 10.0 | ○ | ○ | ○ | 98 |
| Comparative Example 1 | 0.0 | X | X | X | * |
| Comparative Example 2 | 0.5 | X | X | Δ | — |

The following facts became apparent from Table 1.
(1) The addition of DBS enables gelation.
(2) Under the conditions of a standing temperature of 50° C., solidification does not occur when the amount is 0.5 parts by weight, but a gel having high viscosity could be obtained. However, the resulting gel has extremely low conductivity.
(3) When the amount is 0.7 parts by weight or more, the mixture is solidified to obtain a self-supporting gel. As the amount increases, the conductivity rapidly increases.
(4) When the amount of DBS is 2.0 parts by weight or more, it is possible to gelatinize without depending on the standing temperature.

As is apparent from the above results, when the amount of DBS is from 0.7 to 1.0 parts by weight, it is possible to gelatinize only under the conditions of a standing temperature of 50° C. On the other hand, when the amount of DBS is 2.0 wt % or more, it is possible to stably gelatinize without depending on the standing temperature.

As is apparent from the measurement results of the conductivity in Examples 1 to 4, as the amount of DBS increases, the conductivity tends to increase within a range from 0.5 to 98 (mS/cm).

<Gelation 1 by Addition of Alcohols (Standing in Closed State)>

Examples 5 to 9 and Comparative Examples 3 to 9 describe the case where gelation is conducted by standing in a closed state after the addition of alcohols.

Example 5

In this example, the operation was conducted in the same manner as in Example 1, except that ethanol: $C_2H_5OH$ (hereinafter abbreviated to EtOH) was used in place of DBS as the additive to be mixed and the amount thereof was changed to 30 parts by weight and also the time of standing in a closed state was changed to one week from one day, and then the mixture was left to stand at a standing temperature of 10° C., 25° C. and 50° C. to obtain samples gelatinized at different standing temperatures.

With respect to the respective samples obtained in this example, the gelation degree was evaluated and the conductivity was measured in the same manner as in Example 1. The evaluation results of the gelation degree and the measurement results of the conductivity are shown in Table 2.

Example 6

In this example, the operation was conducted in the same manner as in Example 5, except that isopropanol: $(CH_3)_2CHOH$ (hereinafter abbreviated to IPA) was used in place of EtOH as the additive to be mixed and the amount thereof was changed to 30 parts by weight, and then the mixture was left to stand at a standing temperature of 10° C., 25° C. and 50° C. to obtain samples gelatinized at different standing temperatures.

With respect to the respective samples obtained in this example, the gelation degree was evaluated and the conductivity was measured in the same manner as in Example 1. The evaluation results of the gelation degree and the measurement results of the conductivity are shown in Table 2.

Example 7

In this example, the operation was conducted in the same manner as in Example 5, except that polyethylene glycol: $[(CH_2)_2O]_n$ (hereinafter abbreviated to as PEG) having a molecular weight of 1000 was used in place of EtOH as the additive to be mixed and the amount thereof was changed to 10 parts by weight, and then the mixture was left to stand at a standing temperature of 10° C., 25° C. and 50° C. to obtain samples gelatinized at different standing temperatures.

With respect to the respective samples obtained in this example, the gelation degree was evaluated and the conductivity was measured in the same manner as in Example 1. The evaluation results of the gelation degree and the measurement results of the conductivity are shown in Table 2.

Example 8

In this example, the operation was conducted in the same manner as in Example 5, except that PEG having a molecular weight of 1000 was used as the additive in place of EtOH and the amount thereof was changed to 30 parts by weight, and then the mixture was left to stand at a standing temperature of 10° C., 25° C. and 50° C. to obtain samples gelatinized at different standing temperatures.

With respect to the respective samples obtained in this example, the gelation degree was evaluated and the conductivity was measured in the same manner as in Example 1. The evaluation results of the gelation degree and the measurement results of the conductivity are shown in Table 2.

Example 9

In this example, the operation was conducted in the same manner as in Example 5, except that PEG having a molecular weight of 1000 was used as the additive in place of EtOH and the amount thereof was changed to 50 parts by weight, and then the mixture was left to stand at a standing temperature of 10° C., 25° C. and 50° C. to obtain samples gelatinized at different standing temperatures.

With respect to the respective samples obtained in this example, the gelation degree was evaluated and the conductivity was measured in the same manner as in Example 1. The evaluation results of the gelation degree and the measurement results of the conductivity are shown in Table 2.

Comparative Example 3

In this example, the operation was conducted in the same manner as in Example 5, except that methanol: $CH_3OH$ (hereinafter abbreviated to MeOH) was used as the additive in place of EtOH and the amount thereof was changed to 30 parts by weight, and then the mixture was left to stand at a standing temperature of 10° C., 25° C. and 50° C. to obtain samples gelatinized at different standing temperatures.

With respect to the respective samples obtained in this example, the gelation degree was evaluated and the conductivity was measured in the same manner as in Example 1. The evaluation results of the gelation degree and the measurement results of the conductivity are shown in Table 2.

Comparative Example 4

In this example, the operation was conducted in the same manner as in Example 5, except that EtOH was used as the additive to be mixed and the amount thereof was changed to 10 parts by weight, and then the mixture was left to stand at a standing temperature of 10° C., 25° C. and 50° C. to obtain samples gelatinized at different standing temperatures.

With respect to the respective samples obtained in this example, the gelation degree was evaluated and the conductivity was measured in the same manner as in Example 1. The evaluation results of the gelation degree and the measurement results of the conductivity are shown in Table 2.

Comparative Example 5

In this example, the operation was conducted in the same manner as in Example 5, except that EtOH was used as the additive to be mixed and the amount thereof was changed to 50 parts by weight, and then the mixture was left to stand at a standing temperature of 10° C., 25° C. and 50° C. to obtain samples gelatinized at different standing temperatures.

With respect to the respective samples obtained in this example, the gelation degree was evaluated and the conductivity was measured in the same manner as in Example 1. The evaluation results of the gelation degree and the measurement results of the conductivity are shown in Table 2.

Comparative Example 6

In this example, the operation was conducted in the same manner as in Example 5, except that isopropanol (hereinafter abbreviated to IPA) was used as the additive in place of EtOH and the amount thereof was changed to 10 parts by weight, and then the mixture was left to stand at a standing temperature of 10° C., 25° C. and 50° C. to obtain samples gelatinized at different standing temperatures.

With respect to the respective samples obtained in this example, the gelation degree was evaluated and the conductivity was measured in the same manner as in Example 1. The evaluation results of the gelation degree and the measurement results of the conductivity are shown in Table 2.

Comparative Example 7

In this example, the operation was conducted in the same manner as in Example 5, except that isopropanol (hereinafter abbreviated to IPA) was used as the additive in place of EtOH and the amount thereof was changed to 50 parts by weight, and then the mixture was left to stand at a standing temperature of 10° C., 25° C. and 50° C. to obtain samples gelatinized at different standing temperatures.

With respect to the respective samples obtained in this example, the gelation degree was evaluated and the conductivity was measured in the same manner as in Example 1. The evaluation results of the gelation degree and the measurement results of the conductivity are shown in Table 2.

Comparative Example 8

In this example, the operation was conducted in the same manner as in Example 5, except that ethylene glycol: $(CH_2OH)_2$ (hereinafter abbreviated to EG) was used as the additive in place of EtOH and the amount thereof was changed to 30 parts by weight, and then the mixture was left to stand at a standing temperature of 10° C., 25° C. and 50° C. to obtain samples gelatinized at different standing temperatures.

With respect to the respective samples obtained in this example, the gelation degree was evaluated and the conductivity was measured in the same manner as in Example 1. The evaluation results of the gelation degree and the measurement results of the conductivity are shown in Table 2.

Comparative Example 9

In this example, the operation was conducted in the same manner as in Example 5, except that polyethylene glycol (hereinafter abbreviated to PEG) was used as the additive in place of EtOH and the amount thereof was changed to 70 parts by weight, and then the mixture was left to stand at a standing temperature of 10° C., 25° C. and 50° C. to obtain samples gelatinized at different standing temperatures.

With respect to the respective samples obtained in this example, the gelation degree was evaluated and the conductivity was measured in the same manner as in Example 1. The evaluation results of the gelation degree and the measurement results of the conductivity are shown in Table 2.

TABLE 2

| | Additive (parts by weight) | | | | | Evaluation results of gelation degree Standing temperature (° C.) | | | Measurement results of conductivity |
| --- | --- | --- | --- | --- | --- | --- | --- | --- | --- |
| | MeOH | EtOH | IPA | EG | PEG | 10 | 25 | 50 | (mS/cm) |
| Example 5 | | 30 | | | | X | X | ○ | 0.5 |
| Example 6 | | | 30 | | | X | Δ | ○ | 1.0 |
| Example 7 | | | | | 10 | X | X | ○ | 0.5 |
| Example 8 | | | | | 30 | X | X | ○ | 0.2 |
| Example 9 | | | | | 50 | X | ○ | ○ | 0.05 |
| Comparative Example 3 | 30 | | | | | X | X | Δ | — |
| Comparative Example 4 | | 10 | | | | X | X | X | * |
| Comparative Example 5 | | 50 | | | | X | Δ | Δ | — |
| Comparative Example 6 | | | 10 | | | X | X | Δ | — |
| Comparative Example 7 | | | 50 | | | X | Δ | Δ | — |
| Comparative Example 8 | | | | 30 | | X | X | X | * |
| Comparative Example 9 | | | | | 70 | X | Δ | Δ | — |

The following facts became apparent from Table 2.

(1) Under the conditions of a standing temperature of 10° C., it is impossible to gelatinize by mixing any additive.

(2) Under the conditions of a standing temperature of 25° C., only when 50 parts by weight of PEG is added (Example 9), the mixture is solidified to obtain a self-supporting gel. In Example 6 and Comparative Examples 5, 7 and 9, solidification does not occur, but a gel having high viscosity can be confirmed.

(3) The additive, which enables solidification under the conditions of a standing temperature of 50° C. to obtain a self-supporting gel, includes three kinds such as EtOH, IPA and PEG (Examples 5 to 9).

(4) Only when 30 parts by weight of EtOH is added (Example 5), the mixture is solidified to obtain a self-supporting gel. When the amount is 10 or 50 parts by weight (Comparative Examples 4, 5), gelation does not occur, or solidification is not confirmed even if gelation occurs.

(5) Only when 30 parts by weight of IPA is added (Example 6), the mixture is solidified to obtain a self-supporting gel. When the amount is 10 or 50 parts by weight (Comparative Examples 6, 7), solidification is not confirmed even if gelation occurs.

(6) When 10 to 50 parts by weight of PEG is added (Examples 7 to 9), the mixture is solidified to obtain a self-supporting gel. When the amount is 70 parts by weight (Comparative Example 9), gelation does not occur, or solidification is not confirmed even if gelation occurs.

As is apparent from the above results, when using alcohols as the additive under the conditions of standing in a closed state, it is possible to gelatinize by controlling the amount to about 30% by weight.

As is apparent from the measurement results of the conductivity in Examples 5 to 9, the resulting gels have almost the same conductivity within a range from 0.05 to 1.0 (mS/cm) without depending on the kind of the additive.

<Gelation 2 by Addition of Alcohols (Standing in Open State)>

Examples 10 to 12 and Comparative Examples 10 to 11 describe the case where gelation is conducted by standing in an open state after the addition of alcohols.

Example 10

In this example, the operation was conducted in the same manner as in Example 5, except that ethylene glycol: $(CH_2OH)_2$ (hereinafter abbreviated to EG) was used as the additive in place of DBS and the amount thereof was changed to 10 parts by weight, and then the mixture was left to stand at a standing temperature of 10° C., 25° C. and 50° C. in an open state to obtain samples gelatinized at different standing temperatures.

With respect to the respective samples obtained in this example, the gelation degree was evaluated and the conductivity was measured in the same manner as in Example 1. The evaluation results of the gelation degree and the measurement results of the conductivity are shown in Table 3.

Example 11

In the same manner as in Example 10, except that the amount of EG to be mixed as the additive was changed to 30 parts by weight, and then the mixture was left to stand at a standing temperature of 10° C., 25° C. and 50° C. to obtain samples gelatinized at different standing temperatures.

With respect to the respective samples obtained in this example, the gelation degree was evaluated and the conductivity was measured in the same manner as in Example 1. The evaluation results of the gelation degree and the measurement results of the conductivity are shown in Table 3.

Example 12

In the same manner as in Example 10, except that the amount of EG to be mixed as the additive was changed to 50 parts by weight, and then the mixture was left to stand at a standing temperature of 10° C., 25° C. and 50° C. to obtain samples gelatinized at different standing temperatures.

With respect to the respective samples obtained in this example, the gelation degree was evaluated and the conductivity was measured in the same manner as in Example 1. The evaluation results of the gelation degree and the measurement results of the conductivity are shown in Table 3.

Comparative Example 10

In the same manner as in Example 10, except that the amount of EG to be mixed as the additive was changed to 5 parts by weight, and then the mixture was left to stand at a standing temperature of 10° C., 25° C. and 50° C. to obtain samples gelatinized at different standing temperatures.

With respect to the respective samples obtained in this example, the gelation degree was evaluated and the conductivity was measured in the same manner as in Example 1. The evaluation results of the gelation degree and the measurement results of the conductivity are shown in Table 3.

Comparative Example 11

In the same manner as in Example 10, except that the amount of EG to be mixed as the additive was changed to 70 parts by weight, and then the mixture was left to stand at a standing temperature of 10° C., 25° C. and 50° C. to obtain samples gelatinized at different standing temperatures.

With respect to the respective samples obtained in this example, the gelation degree was evaluated and the conductivity was measured in the same manner as in Example 1. The evaluation results of the gelation degree and the measurement results of the conductivity are shown in Table 3.

TABLE 3

| | Additive (parts by weight) | Evaluation results of gelation degree Standing temperature (° C.) | | | Measurement results of conductivity |
|---|---|---|---|---|---|
| | EG | 10 | 25 | 50 | (mS/cm) |
| Example 10 | 10 | X | X | ○ | 1.0 |
| Example 11 | 30 | X | X | ○ | 3.0 |
| Example 12 | 50 | X | X | ○ | 5.0 |
| Comparative Example 10 | 5 | X | X | Δ | * |
| Comparative Example 11 | 70 | X | X | Δ | * |

The following facts became apparent from Table 3.
(1) Under the conditions of a standing temperature of 10° C. and 25° C., it is impossible to gelatinize by using the additive in any amount.
(2) Under the conditions of a standing temperature of 50° C., it is possible to gelatinize. Particularly, when the amount is from 10 to 50 parts by weight, the mixture is solidified to obtain a self-supporting gel. When the amount is from 5 to 70 parts by weight (Comparative Examples 10 to 11), solidification is not confirmed even if gelation occurs.

As is apparent from the above results, when using ethylene glycol (EG) as the additive under the conditions of standing in an open state, it is possible to stably gelatinize by controlling the amount within a range from 10 to 50 parts by weight.

As is apparent from the measurement results of the conductivity in Examples 10 to 12, as the amount of EG increases, the conductivity tends to slightly increase.

<Gelation by Addition of Electrolyte (Standing in Open State)>

Examples 13 to 16 describe the case where gelation is conducted by standing in an open state after the addition of a surfactant, alcohols and an electrolyte.

Example 13

This example describes the case where an alcohol such as EG is used as the additive and the amount thereof is 30 parts by weight and also an electrolyte is added. The operation was conducted in the same manner as in Example 10, except that trifluoromethanesulfonic acid lithium salt: $CF_3SO_3Li$ (hereinafter abbreviated to TFMS-Li) was used as the electrolyte and the amount thereof was adjusted to 5 parts by weight, and then the mixture was left to stand at a standing temperature of 10° C., 25° C. and 50° C. in an open state to obtain samples gelatinized at different standing temperatures.

With respect to the respective samples obtained in this example, the gelation degree was evaluated and the conductivity was measured in the same manner as in Example 1. The evaluation results of the gelation degree and the measurement results of potential difference are shown in Table 4.

Example 14

In this example, the operation was conducted in the same manner as in Example 13, except that trifluoromethanesulfonic acid silver salt: $CF_3SO_3Ag$ (hereinafter abbreviated to TFMS-Ag) was used as the electrolyte in place of TFMS-Li and the amount thereof was changed to 5 parts by weight, and then the mixture was left to stand at a standing temperature of 10° C., 25° C. and 50° C. to obtain samples gelatinized at different standing temperatures.

With respect to the respective samples obtained in this example, the gelation degree was evaluated and the conductivity was measured in the same manner as in Example 1. The evaluation results of the gelation degree and the measurement results of potential difference are shown in Table 4.

Example 15

This example describes the case where a surfactant such as DBS is used as the additive and the amount thereof is 2 parts by weight and also an electrolyte is added. The operation was conducted in the same manner as in Example 13, except that TFMS—Li was used as the electrolyte and the amount thereof was adjusted to 5 parts by weight, and then the mixture was left to stand at a standing temperature of 10° C., 25° C. and 50° C. in an open state to obtain samples gelatinized at different standing temperatures.

With respect to the respective samples obtained in this example, the gelation degree was evaluated and the conductivity was measured in the same manner as in Example 1. The evaluation results of the gelation degree and the measurement results of potential difference are shown in Table 4.

Example 16

In this example, the operation was conducted in the same manner as in Example 15, except that TFMS—Ag was used as the electrolyte in place of TFMS—Li and the amount thereof was changed to 5 parts by weight, and then the mixture was left to stand at a standing temperature of 10° C., 25° C. and 50° C. to obtain samples gelatinized at different standing temperatures.

With respect to the respective samples obtained in this example, the gelation degree was evaluated in the same manner as in Example 1 and an electromotive force was measured in the same manner as described above. The evaluation results of the gelation degree and the measurement results of potential difference are shown in Table 4. The potential difference was measured by the same measuring method. As a result, it was 100 mV.

The following facts became apparent from Table 4.

(1) Under the conditions of a standing temperature of 10° C. and 25° C., it is impossible to gelatinize by using the additive in any amount.
(2) Under the conditions of a standing temperature of 50° C., it is possible to gelatinize in any examples (Examples 13 to 16) and the mixture is solidified to obtain a self-supporting gel.
(3) The potential difference in the case of the gel obtained by adding the electrolyte such as TFMS—Li to the additive such as EG (Example 13) is the same as in the case of distilled water. However, the potential difference in the case of the gel obtained by using TFMS—Ag as the electrolyte (Example 14) increased by 3 times.
(4) The potential difference in the case of the gel obtained by adding the TFMS—Li to the additive such as DBS (Example 15) increased by about 50%. When TFMS—Ag is used as the electrolyte, the potential difference markedly increased by 4 times.

As is apparent from the above results, it is possible to stably gelatinize when using the surfactant such as EG or DBS and the electrolyte such as TFMS—Li or TFMS—Ag were used as the additive under the conditions of standing in an open state. It was confirmed that the addition of the electrolyte improves the potential difference and a remarkable effect is exerted by the addition of the electrolyte such as TFMS—Ag.

Example 17

To an aqueous PEDOT/PSS solution (concentration: about 1.3%, manufactured by Bayer Co., Baytron P), 5% ethylene glycol was added, and the solution was spread over a laboratory dish. The laboratory dish was put in a constant-temperature bath and left to stand at 50° C. for 12 hours to obtain a gel film of PEDOT/PSS.

After adding a small amount of distilled water in the laboratory dish, the laboratory dish was filled with a large amount of acetone, thereby removing the gel film of PEDOT/PSS from the inner bottom face of the laboratory dish.

The resulting gel film was interposed between filter papers and then dried with heating in atmospheric (temperature within a range from 80° C. to 10° C.) to obtain a gel film of this example.

The gel film was cut into a strip having a length of 5 cm, a width of 5 mm and a thickness of 15 μm to obtain a sample a. The sample a was alternatively dipped in water (distilled water) and acetone and volumetric change of the sample a was observed.

After dipping in distilled water, the length of the sample a changed to 5.7 cm from 5 cm, namely, the sample expanded by about 14%. The reason is believed to be as follows. That is,

TABLE 4

| | Additives (Parts by weight) | | | | Evaluation results of gelation degree Standing temperature (° C.) | | | Measurement results of potential difference |
|---|---|---|---|---|---|---|---|---|
| | EG | DBS | TFMS-Li | TFMS-Ag | 10 | 25 | 50 | (mV) |
| Example 13 | 30 | 0 | 5 | 0 | X | X | ○ | 100 |
| Example 14 | 30 | 0 | 0 | 5 | X | X | ○ | 300 |
| Example 15 | 0 | 2 | 5 | 0 | X | X | ○ | 150 |
| Example 16 | 0 | 2 | 0 | 5 | X | X | ○ | 400 | the hydrophilic sample a expanded as a result of incorporation of water molecules into a three-dimensional gel network produced by hydration. Assuming that expansion occurs isotropically, the moisture content relative to the dry weight of the sample a was 48%. Then, when the sample a dipped in distilled water is dipped in acetone, the sample rapidly shrank and the length was reduced to 5.25 cm. The reason is believed to be that dehydration of the sample a was caused by acetone as a poor solvent. It was also confirmed that volumetric change occurs repeatedly by alternatively dipping the sample a in water/acetone.

As is apparent from the above results, the sample a made of the conductive polymer gel according to this example has a function suited for use as an actuator because of its behavior described above.

Comparative Example 12

In the same manner as in Example 17, a strip-shaped sample β was made from a gel film obtained in the same manner as in Example 17, except that ethylene glycol was not used.

The sample β retained the strip shape in an air, but swelled when dipped in distilled water. With a lapse of time, the swelling degree proceeds further and then the sample was broken into pieces. It is assumed that the gel of the sample B was broken because it is not crosslinked with ethylene glycol and is therefore dynamically brittle.

As is apparent from the results of Example 17 and Comparative Example 12, the conductive polymer gel of the present invention is suited for use as an actuator when formed into a strip.

Example 18

Figure 3:
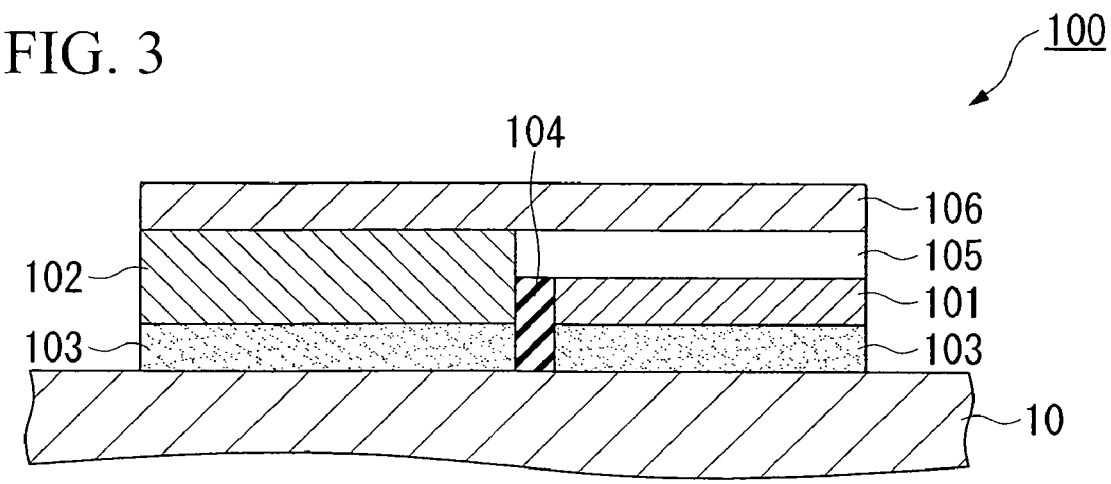
FIG. 3 is a schematic sectional view showing an example of an iontophoretic patch label for local delivery of a treating agent according to the present invention.
Figure 4:
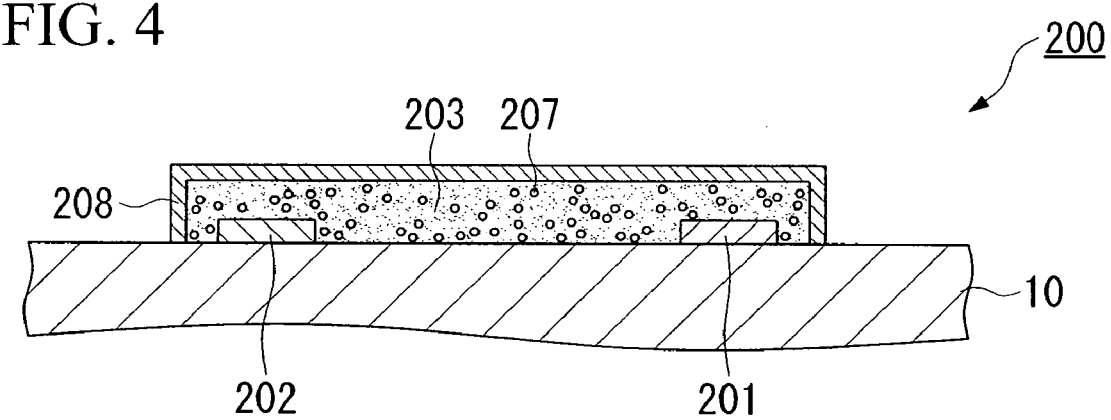
FIG. 4 is a schematic sectional view showing another example of an iontophoretic patch label for showing local delivery of a treating agent according to the present invention.
Figure 5:
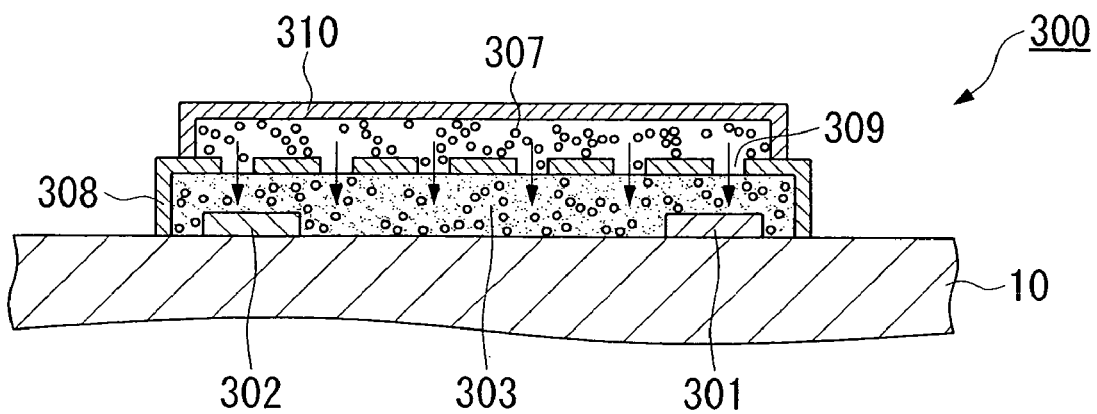
FIG. 5 is a schematic sectional view showing still another example of an iontophoretic patch label for local delivery of a treating agent according to the present invention.

This example describes an embodiment wherein the above conductive polymer gel, for example, the gel obtained in Example 3 is applied to an iontophoretic patch label for local delivery of a treating agent with reference to FIG. 3 to FIG. 5.

FIG. 3 is a schematic sectional view showing an example of an iontophoretic patch label for local delivery of a treating agent according to the present invention. FIG. 4 and FIG. 5 are schematic sectional views each showing another example of an iontophoretic patch label for showing local delivery of a treating agent according to the present invention.

Any iontophoretic patch label for local delivery of a treating agent shown in FIG. 3 to FIG. 5 is an iontophoretic patch label comprising a pad, and electrodes composed of an anode and a cathode provided on one surface of the pad at regular intervals, which locally delivers a treating agent to an analyte by contacting the other surface on the pad with the analyte and applying an electric current between the electrodes. The pad is made of a conductive polymer gel containing water, as a main component, a conductive conjugated polymer, and a surfactant and/or an alcohol.

The iontophoretic patch label 100 for local delivery of a treating agent shown in FIG. 3 comprises an electrode 101 which serves as an anode, and another electrode 102 which serves as a cathode, and a pad 103 made of the conductive polymer gel of the present invention disposed so as to stretch over both electrodes. Between the electrodes, an insulating material 104 prevents the electrodes from contacting each other, and a power supply 105 is connected to the electrodes. The iontophoretic patch label 100 for local delivery of a treating agent comprises a sheet-like base material 106 such as paper or plastic, and these parts stacked on the base material at each predetermined position.

The treating agent (not shown, for example, chemical, cosmetic, etc.) is previously prepared on the surface of an analyte 10 such as skin, and the treating agent is ionized by applying a weak electric current between the electrodes 101 and 102 from the power supply 105, thereby to permeate into the local tissue through the analyte 10, and thus the treating agent can be efficiently delivered.

In FIG. 4, the reference symbol, whose two lower figures are the same as those in the reference symbol in FIG. 3, denotes the same component part. The iontophoretic patch label 200 for local delivery of a treating agent shown in FIG. 4 is different from the iontophoretic patch label 100 for local delivery of a treating agent shown in FIG. 3 in that the treating agent 207 is previously contained in the pad 203 made of the conductive polymer gel.

Since the treating agent 207 is previously contained in the pad 203 in the iontophoretic patch label 200 for local delivery of a treating agent, it is excellent in handling properties or convenience during use because it is not necessary to previously apply the treating agent on the surface of the analyte 10.

In FIG. 5, the reference symbol, whose two lower figures are the same as those in the reference symbol in FIG. 3, denotes the same component part. The iontophoretic patch label 300 for local delivery of a treating agent shown in FIG. 5 is different from the iontophoretic patch label 100 for local delivery of a treating agent shown in FIG. 3 in that a case-shaped base material 308 made of plastic comprises numerous of fine pores 309 provided thereon and a container 310 containing a treating agent 307 is disposed on the base, material 308.

In the case of the iontophoretic patch label 300 for local delivery of a treating agent, the treating agent 307 contained in the container 310 is fed through a hole 309 toward the gel 303 filled in the base material 308 in the direction shown by the arrow. The treating agent may be forcibly fed by an external power supply (not shown) or naturally fed by gravity or an adsorption power. Such a feeding system makes it possible to deliver the treating agent to the surface of the analyte 10, and thus a preferable patch label can be provided for a long period.

Example 19

This example describes an embodiment wherein the above conductive polymer gel, for example, the gel obtained in Example 3 is applied to a biomedical electrode with reference to FIG. 6 to FIG. 10.

Figure 6:
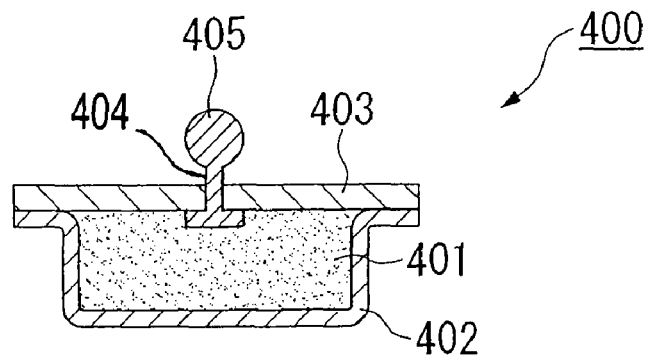
FIG. 6 is a schematic sectional view showing an example of a biomedical electrode according to the present invention.

FIG. 6 is a schematic sectional view showing an example of a biomedical electrode according to the present invention. FIG. 7 to FIG. 10 are schematic sectional views each showing another example of a biomedical electrode according to the present invention.

Any biomedical electrode shown in FIG. 6 to FIG. 10 is a biomedical electrode comprising an electrode device, and a member which electrically and physically connects the electrode device to an analyte, wherein the member is made of a conductive polymer gel and the conductive polymer gel contains water, as a main component, a conductive conjugated polymer, and a surfactant and/or an alcohol.

In the biomedical electrode 400 shown in FIG. 6, a member 401 made of the conductive polymer gel of the present invention is contained in a container 402 subjected to a silicone treatment so as to impart releasability to the surface of a container made of plastic having excellent releasability such as polypropylene or polyethylene terephthalate, or paper, and is also sealed with a sheet-like cap body 403 made of polypropylene, polyethylene terephthalate, polyethylene or polyvinyl chloride which exhibits adhesion and non-conductivity to the member 401. The cap body 403 is provided with an electrode device 404 so as to be electrically conductive to the member 401 via one end of the cap body. The other end 405 of the electrode device 404 serves as a terminal to which a lead wire extending from an electrocardiograph is connected.

In the case of recording an electrocardiogram using the biomedical electrode 400, a lead wire of the electrocardiograph is connected to the other end 405 of the electrode device 404 and the container 402 is removed from the cap body 403, and then the member 401 made of the conductive polymer gel is put on the human body (analyte) at a predetermined position.

Figure 7:
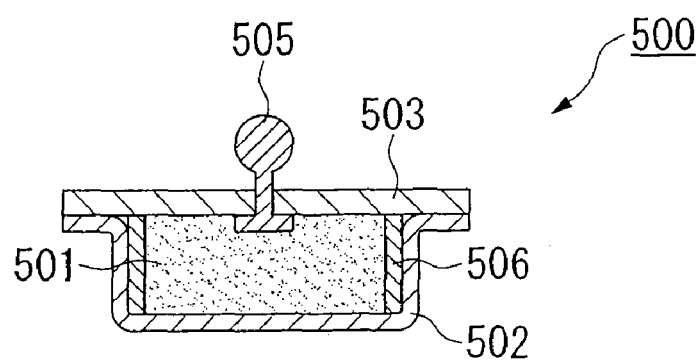
FIG. 7 is a schematic sectional view showing another example of a biomedical electrode according to the present invention.

In FIG. 7, the reference symbol, whose two lower figures are the same as those in the reference symbol in FIG. 6, denotes the same component part. The biomedical electrode 500 shown in FIG. 7 is different from the biomedical electrode 400 shown in FIG. 6 in that an adhesive layer 506 is provided along the inside layer of a container 502 containing a member 501 made of a conductive polymer gel.

When the container 502 is removed from the cap body 503, the adhesive layer 506 moves toward the side of the member 501. Therefore, in the case of putting the member 501 made of the conductive polymer gel on the skin surface of the human body (analyte) at a predetermined position, adhesion with the skin surface is improved by an action of the adhesive layer 506. It is preferred that the adhesive layer 506 be previously provided inside the container 502 and that the inside of the container 502 be subjected to a releasing treatment so as to enhance releasability from the container 502.

Figure 8:
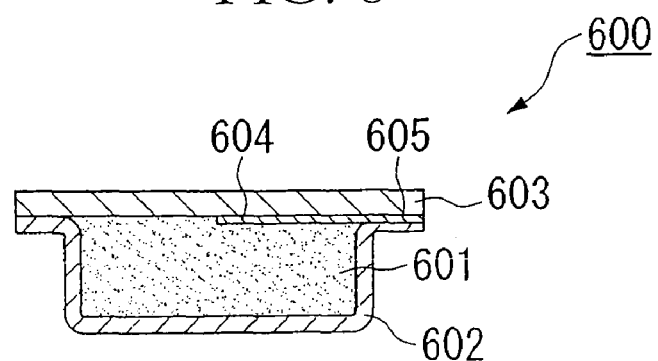
FIG. 8 is a schematic sectional view showing still another example of a biomedical electrode according to the present invention.

In FIG. 8, the reference symbol, whose two lower figures are the same as those in the reference symbol in FIG. 6, denotes the same component part. The biomedical electrode 600 shown in FIG. 8 is different from the biomedical electrode 400 shown in FIG. 6 in that a planar electrode device 604, which is formed by pattern-printing a conductive ink or putting a metal foil on the cap body 503 made of a plastic film at a predetermined position, is used in place of the steric electrode device 404.

Since the planar electrode device 604 makes it possible to provide a flat external surface to the biomedical electrode 600, the skin of the human body (analyte) may not be injured and safety during use can be improved.

Figure 9:
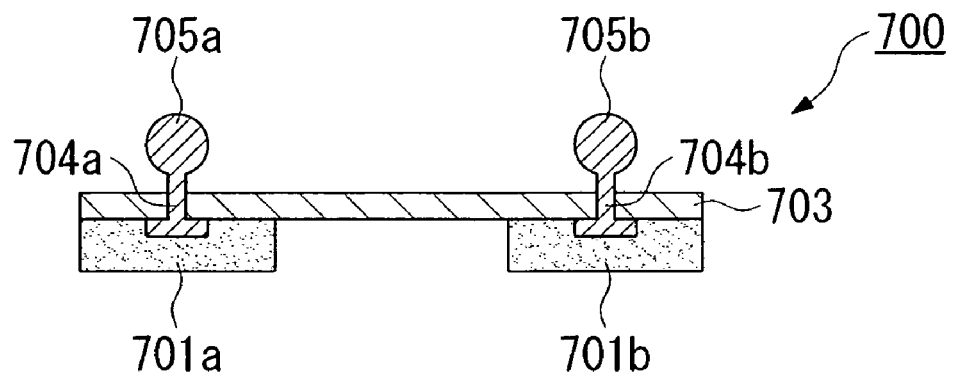
FIG. 9 is a schematic sectional view showing a further example of a biomedical electrode according to the present invention.

In FIG. 9, the reference symbol, whose two lower figures are the same as those in the reference symbol in FIG. 6, denotes the same component part. The biomedical electrode 700 shown in FIG. 9 is different from the biomedical electrode 400 shown in FIG. 6 in that, in a cap body, electrode devices 705a and 705b are arranged at regular intervals and each electrode device is provided with members 701a and 701b made of a conductive polymer gel.

In the case of measuring or treating using the biomedical electrode 700, a lead wire of an external device is connected to the electrode devices 705a and 705b and the members 701a, 701b made of the conductive polymer gel are put on the human body (analyte) at a predetermined position.

Figure 10:
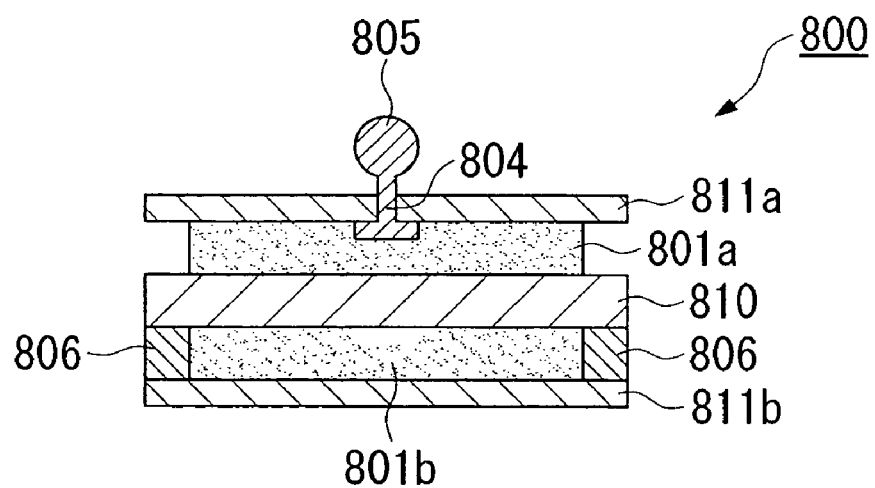
FIG. 10 is a schematic sectional view showing a still further example of a biomedical electrode according to the present invention.

In FIG. 10, the reference symbol, whose two lower figures are the same as those in the reference symbol in FIG. 6, denotes the same component part. The biomedical electrode 800 shown in FIG. 10 is different from the biomedical electrode 400 shown in FIG. 6 in that members 801a and 801b made of a conductive polymer gel are arranged on both surfaces of a base material 810 made of a nonwoven fabric and, furthermore, separators 811a and 811b are provided opposite to the base material 810 via the members 801a and 801b. FIG. 10 shows an example wherein an acrylic-, rubber-, silicone-, or vinyl ether-based adhesive layer 806 is provided on the side of the member 801b. As the separators 811a and 811b, there can be preferably used a plastic film or paper subjected to a releasing treatment by applying a silicone resin or fluororesin to one or both surfaces thereof.

The biomedical electrode 800 is produced by fixing the separator 811b provided with an adhesive layer 806 at a predetermined position to the lower surface of the base material 810 using an adhesive, disposing a frame (not shown) on the upper surface of the base material 810 at a predetermined position, and filling the frame with a flowable composition containing water, as a main component, a conductive conjugated polymer, and a surfactant and/or an alcohol. Consequently, the flowable composition leaches downward through openings or gaps of the base material 810. When the flowable composition in the frame and the flowable composition leached downward are left to stand as they are, both flowable compositions are gelatinized to form conductive polymer gels 801a and 801b on both surfaces of the base material 810. Then, the frame is removed and the separator 811a is disposed so as to contact with the polymer gel 801a to obtain a biomedical electrode 800.

The biomedical electrode 800 is used by putting the conductive polymer gel 801b to the human body (analyte) at a predetermined position after removing the separator 811b. Since the adhesive layer 806 provided outside the conductive polymer gel 801b serves to enhance adhesion of the conductive polymer gel 801b to the human body (analyte), it is made possible to ensure stability upon measurement.

Examples 20 to 23

The conductive polymer gel 2002 shown in FIG. 17B was produced by the following method.

100 parts by weight of a colloidal dispersion of PEDOT/PSS as a conductive conjugated polymer 2022 (about 1.3 wt % colloidal water dispersion of a conductive polymer (PEDOT/PSS) manufactured by Bayer Co. under the trade name of Baytron P) was mixed with 1 part by weight of dodecylbenzenesulfonic acid ($C_{12}H_{25}C_6H_4SO_3H$) (hereinafter also referred to as DBS) as a surfactant 2023 and, after stirring for about 10 minutes, the mixture was left to stand at a standing temperature of 50° C. in a closed state for one day to obtain a conductive polymer gel 2002.

According to the formulation shown in Table 5, a conductive polymer gel 2002, a conductive powder 2003 as a silver powder, a resin binder 2004 and a solvent were mixed to obtain a conductive paste 2001.

In Table 5, the total amount of the conductive polymer gel 2002, the conductive powder 2003 as the silver powder, the resin binder 2004 and the solvent is 100 parts by weight.

The conductive powder 2003 used as the silver powder is a mixture of a silver powder (manufactured by TOKURIKI HONTEN CO., LTD. under the trade name of SILVEST E-20) and a silver powder (manufactured by TOKURIKI HONTEN CO., LTD. under the trade name of SILVEST) TCG-7 in a weight ratio of 8:2.

As the resin binder 2004, a polyester (manufactured by TOYOBO CO., LTD. under the trade name of VYLON 500) was used.

TABLE 5

| | Silver powder | Resin binder | Solvent Butyl-cellosolve acetate | Isophorone | Conductive polymer gel |
|---|---|---|---|---|---|
| Example 20 | 61.9 | 14.3 | 17.1 | 1.9 | 4.8 |
| Example 21 | 59.1 | 13.6 | 16.4 | 1.8 | 9.1 |
| Example 22 | 56.5 | 13.0 | 15.7 | 1.7 | 13.0 |
| Example 23 | 54.2 | 12.5 | 15.0 | 1.7 | 16.7 |
| Comparative Example 13 | 70.0 | 15.0 | 13.0 | 2.0 | 0 |

By a screen printing method, a conductive paste 2001 was applied to a PET film (manufactured by Toray Industries, Inc. under the trade name of Lumirror S) made of a base material 2006 in the form of a planar coil.

The PET film coated with the conductive paste 2001 was left to stand in a hot blast stove at an inner temperature of 150° C. for 30 minutes, thereby to cure the conductive paste 2001, thus forming an antenna coil 2071.

Then, by an NCP (Non Conductive Resin Paste) technique, IC chip 2072 (manufactured by Philips under the trade name of Mifare) was mounted to the base material 2006 so that a gold-plated bump is electrically connected to both terminals of the antenna coil 2071.

As described above, a non-contact type IC media 2005 comprising an RF-ID module 2007 composed of the antenna coil 2071 formed by curing of the conductive paste 2001, and an IC chip 2072 connected to the antenna coil 2071 was produced, as shown in FIG. 18.

Comparative Example 13

In the same manner as in the above Example, except for using a conductive paste which does not contain a conductive polymer gel and contains a silver powder, a resin binder and a solvent in the contents shown in Table 5, a non-contact type IC media was produced.

The electrical resistance of the antenna coil 2071 of each non-contact type IC media 2005 was measured. A non-contact type IC media 2005 to which the IC chip 2072 is not mounted, that is, IC media comprising the base material 2006 and the antenna coil 2071 formed by applying the conductive paste 2001 on the base material 2006 and curing the conductive paste was fired, and then the amount of the metal residue after curing was determined. The resulting electrical resistance and the resulting amount of the metal residue are shown in Table 6.

TABLE 6

| | $(G + C_p)/(G + P)$ | $(G + P)/B$ | Sheet resistance | Metal residue after firing |
|---|---|---|---|---|
| Example 20 | 0.0714 | 4.67 | 2.7 | 68% or less |
| Example 21 | 0.133 | 5.00 | 4.9 | 60% or less |
| Example 22 | 0.188 | 5.33 | 6.8 | 58% or less |
| Example 23 | 0.235 | 5.67 | 10.3 | 56% or less |
| Comparative Example 13 | 0 | 4.67 | 1.0 | 70% or more |

As the content of the conductive polymer gel 2002 increases, the electrical resistance increases. Like the Examples, when a ratio (G+P)/B is from 4 to 6, the electrical resistance is 11 O/□ or less and sufficient conductivity suited for wiring can be achieved and the resulting product can be used as the antenna coil 2071.

By increasing the content of the conductive polymer gel 2002, the content of the silver powder can be reduced and the environmental burden can be suppressed. In particular, when the ratio $((G+C_p)/(G+P))$ is 0.07 or more, the amount of the metal residue after curing becomes 68% or less and the environmental burden can be sufficiently suppressed as compared with Comparative Example 13.

When the ratio $((G+C_p)/(G+P))$ is 0.13 or more, the metal residue after curing becomes 60% or less and the environmental burden can be remarkably suppressed as compared with Comparative Example 13.

With respect to each non-contact type IC media 2005, transmission and reception of data were conducted using a reader/writer (manufactured by Philips). It was confirmed that any non-contact type IC media 2005 is capable of transmitting data to or receiving data from the IC chip 2072.

Example 24

The conductive polymer gel 3005 shown in FIG. 21B was produced by the following method.

100 Parts by weight of PEDOT/PSS as a colloidal dispersion of a conductive conjugated polymer 3052 (about 1.3 wt % colloidal water dispersion of a conductive polymer (PEDOT/PSS) manufactured by Bayer Co. under the trade name of Baytron P) was mixed with 1 part by weight of dodecylbenzenesulfonic acid ($C_{12}H_{25}C_6H_4SO_3H$) (hereinafter also referred to as DBS) as a surfactant 3053 and, after stirring for about 10 minutes, the mixture was left to stand at a standing temperature of 50° C. in a closed state for one day to obtain a conductive polymer gel 3005.

Using a perfluorosulfonic acid film (manufactured by Dupont under the trade name of Nafion, thickness: 150 µm) as the polymer electrolyte film 3002, the polymer electrolyte film 3002 was disposed between a pair of separators 3004 while contacting a conductive polymer gel 3005 (2 cm×2 cm, 15 µm in thickness) with both surfaces of he polymer electrolyte film. The polymer electrolyte film 3002 and the conductive polymer gel 3005 were interposed between the separators 3004 to obtain a cell 3001 shown in FIG. 19.

On the surface of the separator 3004, a groove, which serves as a passage of a gas, is provided, and thus a hydrogen or oxygen gas can be fed between the separator 3004 and the conductive polymer gel 3005.

Among conductive polymer gels 3005 provided on both surfaces of the polymer electrolyte film 3002, one conductive polymer gel 3005 serves as a fuel electrode 3031, while the other conductive polymer gel 3005 serves as an air electrode 3032.

At an operating temperature of 80° C., when a hydrogen gas is fed between a separator 3041 and a fuel electrode 3031 at the fuel electrode side, and an oxygen gas is fed between a separator 3042 and an air electrode 3032 at the air electrode side, an electric current was discharged from the cell 3001 and thus an electromotive force of 0.905 V was achieved.

Comparative Example 14

Figure 22:
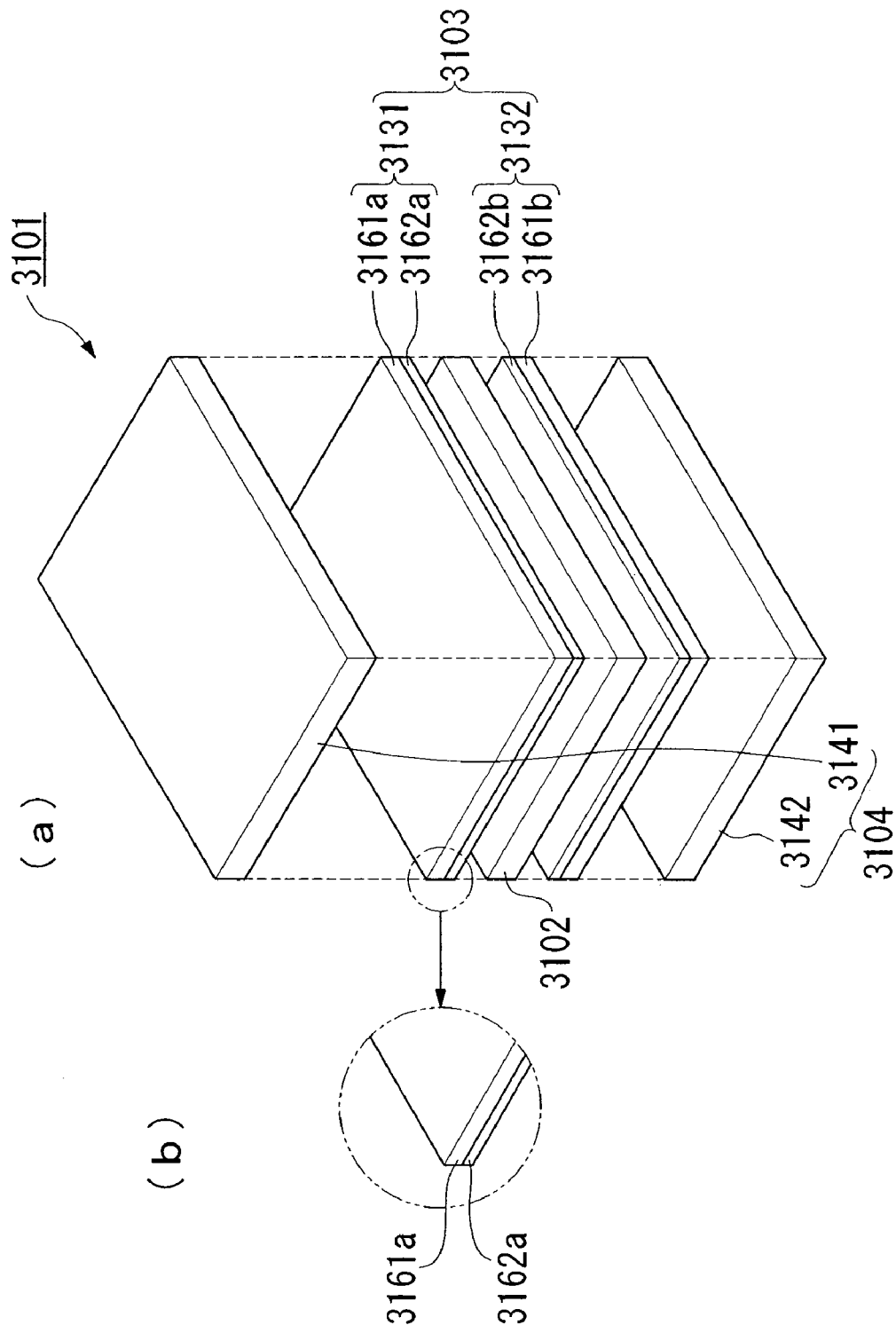
FIG. 22 is a schematic view showing an example of a cell of a fuel cell according to the prior art.

In the same manner as in Example 24, except that carbon papers 3161a and 3161b (2 cm×2 cm, 300 to 500 µm in thickness) supported with platinum catalysts 3162a and 3162b were used as the fuel electrode 3131 and the air electrode 3132 in place of the conductive polymer gel 3005, a cell 3101 shown in FIG. 22 was produced.

At an operating temperature of 80° C., when a hydrogen gas is fed between a separator 3141 and a fuel electrode 3131 at the fuel electrode side, and an oxygen gas is fed between a separator 3142 and an air electrode 3132 at the air electrode side, an electric current was discharged from the cell 3101 and thus an electromotive force of 0.945 V was achieved.

The fuel electrode 3131 and the air electrode 3132 have a thickness of 300 to 500 μm in Comparative Example 14, while the fuel electrode 3031 and the air electrode 3032 has a thickness of 15 μm and the thickness can be reduced to about $\frac{1}{20}$ to $\frac{1}{30}$ in Example 24. In Example 24, it was possible to achieve high electromotive force which is almost the same as that in the case of Comparative Example 14.

Unlike Comparative Example 14, platinum was not used in Example 24 and an electrode for fuel cells could be produced at low cost.

INDUSTRIAL APPLICABILITY

The present invention provides a conductive polymer gel which can maintain good conductivity even when exposed to an atmosphere at a temperature lower than the freezing point of water. The conductive polymer gel can be employed for various purposes such as actuators, iontophoretic patch labels, biomedical electrodes, toners, conductive functional members, antistatic sheets, printed circuit members, conductive pastes, electrodes for fuel cell, and fuel cells. Also the conductive polymer gel contributes to output stability of equipments which require stable functions under such severe conditions that ambient temperature is lower than the freezing point of water.

The invention claimed is:

1. A conductive polymer gel comprising water as a main component, a conductive conjugated polymer, a surfactant and, optionally, an alcohol, wherein an amount of the water in the conductive polymer gel is from 66 weight percent to 98 weight percent, wherein the surfactant is an alkylbenzenesulfonic acid wherein the conductive conjugated polymer is doped with a dopant.

2. The conductive polymer gel according to claim 1, wherein the dopant is polystyrenesulfonic acid.

3. A conductive polymer gel comprising water as a main component, a conductive conjugated polymer, a surfactant and, an alcohol, wherein an amount of the water in the conductive polymer gel is from 66 weight percent to 98 weight percent, wherein the surfactant is an alkylbenzenesulfonic acid, and wherein the alcohol is at least one of a monohydric alcohol having 3 or more carbon atoms and a polyhydric alcohol.

4. A conductive polymer gel comprising water as a main component; a conductive conjugated polymer; an alcohol selected from the group consisting of a monohydric alcohol, a glycol, a chain polyhydric alcohol, and a cyclic polyhydric alcohol, wherein the alcohol is not a polymer-like alcohol; and a surfactant, wherein an amount of the water in the conductive polymer gel is from 66 weight percent to 98 weight percent, and wherein the conductive polymer gel contains alkylbenzenesulfonic acid as the surfactant.

* * * * *

UNITED STATES PATENT AND TRADEMARK OFFICE
CERTIFICATE OF CORRECTION

PATENT NO. : 7,795,335 B2
APPLICATION NO. : 10/542917
DATED : September 14, 2010
INVENTOR(S) : Hidenori Okuzaki et al.

Page 1 of 1

It is certified that error appears in the above-identified patent and that said Letters Patent is hereby corrected as shown below:

On the title page, Item (54), and in Column 1 the Title is incorrect. Item (54) and Column 1 should read:

-- (54) CONDUCTIVE POLYMER GEL AND PROCESS FOR PRODUCING THE SAME, ACTUATOR, PATCH LABEL FOR ION INTRODUCTION, BIOELECTRODE, TONER, CONDUCTIVE FUNCTIONAL MEMBER, ANTISTATIC SHEET, PRINTED CIRCUIT MEMBER, CONDUCTIVE PASTE, ELECTRODE FOR FUEL CELL, AND FUEL CELL --

On the title page, Item (87), the PCT Pub. No. is incorrect. Item (87) should read:

-- (87) PCT Pub. No.: WO2004/067637

PCT Pub. Date: Aug. 12, 2004 --

Signed and Sealed this

Thirtieth Day of November, 2010

David J. Kappos
*Director of the United States Patent and Trademark Office*